United States Patent [19]

Kashimura et al.

[11] Patent Number: 5,326,848

[45] Date of Patent: Jul. 5, 1994

[54] THERMOTROPIC LIQUID CRYSTAL POLYESTER

[75] Inventors: Tsugunori Kashimura, Kurashiki; Mitsuo Matsumoto, Okayama; Shuhei Ishino, Kurashiki, all of Japan

[73] Assignee: Kuraray Co., Ltd., Kurashiki, Japan

[21] Appl. No.: 959,342

[22] Filed: Oct. 13, 1992

Related U.S. Application Data

[63] Continuation-in-part of Ser. No. 726,912, Jul. 8, 1991, abandoned.

[30] Foreign Application Priority Data

| Jul. 9, 1990 | [JP] | Japan | 2-182279 |
| Jul. 10, 1990 | [JP] | Japan | 2-183278 |
| Jul. 13, 1990 | [JP] | Japan | 2-186173 |
| Jan. 9, 1992 | [JP] | Japan | 4-21906 |

[51] Int. Cl.$^5$ .................. C08G 63/00; C08G 63/02
[52] U.S. Cl. ................... 528/190; 528/176; 528/192; 528/193
[58] Field of Search ............ 528/176, 190, 192, 193

[56] References Cited

U.S. PATENT DOCUMENTS

| 3,778,410 | 12/1973 | Kuhfuss et al. |
| 3,804,805 | 4/1974 | Kuhfuss et al. |
| 4,782,132 | 11/1988 | Nozawa et al. ............ 528/193 |

FOREIGN PATENT DOCUMENTS

| 0285373 | 10/1988 | European Pat. Off. |
| 2348698 | 4/1974 | Fed. Rep. of Germany |
| 192762 | 8/1986 | Japan |
| 68813 | 3/1987 | Japan |
| 119265 | 5/1987 | Japan |
| 187033 | 8/1987 | Japan |
| 6399227 | 4/1988 | Japan |
| 45242 | 2/1989 | Japan |
| 1168727 | 7/1989 | Japan |
| 288421 | 11/1989 | Japan |

*Primary Examiner*—John Kight, III
*Assistant Examiner*—T. Mosley

*Attorney, Agent, or Firm*—Oblon, Spivak, McClelland, Maier & Neustadt

[57] ABSTRACT

Provided are novel thermotropic liquid crystal polyesters consisting essentially of the following structural units (1), (2) and (3) or those (2), (3), (4) and (5) and shaped articles comprising these polyesters. Also provided are packaging materials and containers comprising the above thermotropic liquid crystal polyesters or a polyester consisting essentially of the following structural units (2), (3), (5) and (6).

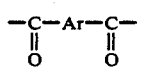

(1)

wherein Ar represents a 1,4-phenylene group or 2,6-naphthylene group

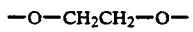
(2)

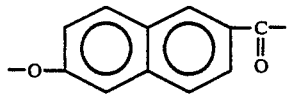

(3)

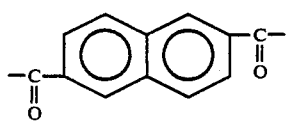

(4)

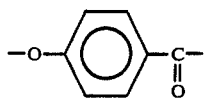

(5)

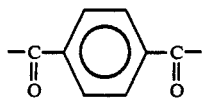

(6)

14 Claims, No Drawings

THERMOTROPIC LIQUID CRYSTAL POLYESTER

CROSS REFERENCE TO RELATED APPLICATIONS

This application is a continuation-in-part of U.S. application Ser. No. 07/726,912 filed Jul. 8, 1991 abandoned.

BACKGROUND OF THE INVENTION

1. Field of the Invention

The present invention relates to a novel thermotropic liquid crystal polyester, shaped articles comprising the same, and packaging materials and containers having high gas barrier properties.

2. Description of the Related Art

Polyesters, in particular polyethylene terephthalate (hereinafter sometimes referred to as "PET") are excellent in hygienic property, odor-keeping property, processability and like properties and are hence widely used as containers for seasonings such as soy sauce and sauce, soft drinks such as juice, cola and soda pop, draft beer, cosmetics, medicines and the like. It is expected that polyester bottles will be more widely used as replacement for glass bottles, since they are, in addition to the above features, lighter than glass and pressure-proof and of high gas barrier properties. For polyester containers, however, further improvement of gas barrier property is strongly desired since bottles for lager beer, wine and similar alcoholic drinks are stored for a long time and those for carbonated drinks are getting smaller in their size so that their surface areas per capacity are increasing, whereby there is more strictly required prevention of invasion of oxygen from outside or reduction in the amount of carbon dioxide gas dissipated outwardly. The gas barrier property of PET is very difficult to improve because it has already attained a considerably high level and that any improvement should not impair the processability into containers and the mechanical properties such as pressure-proofness. Various processes have been proposed to improve the gas barrier property of PET containers. For example a known process comprises coating polyvinylidene chloride or similar gas-barrier resins on the outer and inner surface of PET containers, and U.S. Pat. No. 4,980,211 discloses a multilayered structure of 2 to 5 layers utilizing a saponified ethylene-vinyl acetate copolymer. These processes however have disadvantages that additional equipment for coating or making multilayered container is required besides conventional molding and forming machines for polyesters and that the use of different polymers leads to readily delamination, with multilayered containers, or difficulty in the recovery or disposal by incineration of used containers. Japanese Patent Publication No. 33618/1978 and U.S. Pat. No. 4,398,642 propose a process which comprises producing containers from a composition obtained by previously blending polyester with nylon or like resins. Although the process enables containers to be produced with existing equipment, the obtained containers suffer a decrease in mechanical properties and have a disadvantage in recovery and re-use.

The use of what is known as thermotropic liquid crystal polymers, which are capable of forming optically anisotropic melt phase, has been proposed in recent years (See, for example, Japanese Patent Application Laid-opens Nos. 192762/1986, 119265/1987, 187033/1987, 45242/1989 and 288421/1 989). Also, Polym. Prepr. (Am. Chem. Soc., Div. Polym. Chem.), 30 (1), 3–4 (1989) reports that the thermotropic liquid crystal polymer obtained from 40 mol % polyethylene terephthalate and 60 mol % of 4-acetoxybenzoic acid gives a melt-extruded film having an oxygen permeability of 36 ml . 20 $\mu m/m^2$.day.atm. Further U.S. Pat. Nos. 3,778,410 and 3,804,805 disclose a process for producing a copolyester, which comprises reacting a polyester comprising repeating units represented by the formula —OC—$R_1$—CO—O—$R_2$—O— wherein $R_1$ represents a divalent alicyclic radical having 4 to 20 carbon atoms, a divalent aliphatic radical having 1 to 40 carbon atoms or a divalent aromatic radical having 6 to 16 carbon atoms with carbonyl linkages separated by at least 3 carbon atoms, and $R_2$ represents a divalent aliphatic radical having 2 to 40 carbon atoms, a divalent alicyclic radical having 4 to 20 carbon atoms, a divalent aromatic radical having 6 to 20 carbon atoms or a divalent poly(alkylene oxide) radical having a molecular weight of 200 to 8,000; with an acyloxy aromatic carboxylic acid. These USP's mention substantially only acyloxy benzoic acids as examples of the acyloxy aromatic carboxylic acid.

However, the use of thermotropic liquid crystal polymers so far proposed for molding or forming shaped articles that act as gas-barrier materials has the following two principal problems.

Firstly, shaped articles obtained from thermotropic liquid crystal polymers so far proposed generally have high degree of crystallinity, large anisotropy in mechanical properties and low elongation, whereby their stretching is substantially impossible. It is very difficult to process these polymers into various gas-barrier shaped articles, such as film, sheet, bottles, cups, trays and bags.

To overcome the problem, Japanese Patent Application Laid-open No. 187033/1987 proposes a laminated and stretched shaped article comprising a layer of a thermotropic liquid crystal polyester and, on at least one surface thereof, a layer of polyester comprising polyethylene terephthalate component. The application discloses, with respect to the thickness ratio between the polyester (not exhibiting optical anisotropy) layer and the layer of the thermotropic liquid crystal polyester, that the thickness of the polyester layer is 50 to 98% of the total thickness of the laminated and oriented shaped article and that of the thermotropic liquid polyester layer is 2 to 50%, preferably 5 to 20% on the same basis, and describes that with a thickness of the thermotropic liquid crystal polyester exceeding 50% it is more difficult to stretch the laminated article than is the case with the usual polyester alone. Thermotropic liquid crystal polyesters having small anisotropy in mechanical properties have been also proposed. For example Japanese Patent Application Laid-open No. 28428/1985 discloses a thermotropic liquid crystal polyester comprising terephthaloyl units, 1,3-dioxyphenylene units and 2-substituted-1,4-dioxyphenylene units. Introduction of isoskeleton and substituents as in this proposal tends to improve processability of thermotropic liquid crystal polymer and to render it more ready, although not sufficient, to produce various shaped articles from the resulting polymers.

The second problem that arises when thermotropic liquid crystal polymers so far proposed are used for molding or forming gas barrier shaped articles is that these polymers are not always molded or formed into shaped articles having sufficient gas barrier properties. See, for example, the oxygen permeability of 36 ml . 20 μm/m².day.atm described in the afore-mentioned Polym. Prepr. (Am. Chem. Soc., Div. Polym. Chem.), 30 (1), 3-4 (1989), for a film of the thermotropic liquid crystal polymer obtained from 40 mol % of polyethylene terephthalate and 60 mol % of 4-acetoxybenzoic acid. This film cannot be said to be a high gas barrier material. Further a study made by the present inventors has revealed that films obtained from the thermotropic liquid crystal polyester described in Japanese Patent Application Laid-open No. 28428/1985 do not have a sufficiently high oxygen barrier property.

Japanese Patent Application Laid-open No. 68813/1987 discloses a copolyester obtained by reacting an acetoxy aromatic carboxylic acid mixture comprising p-acetoxybenzoic acid and 6-acetoxy-2-naphthoic acid with polyethylene terephthalate or polybutylene terephthalate, and describes that the product has higher flexural strength, flexural modulus and thermal deformation temperature than products obtained by reacting p-acetoxybenzoic acid alone as the acetoxy aromatic carboxylic acid to be used. This application however does not describe any packaging material or container comprising said copolyester, or teach that said copolyester has high gas barrier property, formability (stretchability), low temperature fluidity and similar excellent characteristics.

SUMMARY OF THE INVENTION

An object of the present invention is to provide a novel thermotropic liquid crystal polyester having excellent formability and excellent gas barrier properties in shaped articles therefrom, in particular excellent oxygen gas barrier property.

Another object of the present invention is to provide a shaped article having high gas barrier property and comprising the above novel thermotropic liquid crystal polyester.

Still another object of the present invention is to provide a packaging material and container having high gas barrier properties.

These objects as well as other objects and advantages of the present invention will become apparent to those skilled in the art from the following description.

One of the above objects is achieved by providing a novel thermotropic liquid crystal polyester consisting essentially of a structural unit (1) represented by the following formula

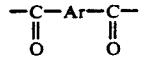

wherein Ar represents a 1,4-phenylene group or 2,6-naphthylene group; a structural unit (2) represented by the following formula

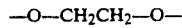

and a structural unit (3) represented by the following formula

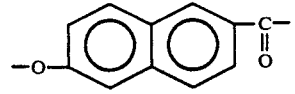

; said structural units (1) and (2) being contained in substantially the same moles, the sum of said structural units (1) and (2) contained being 15 to 90 mol % and said structural unit (3) being contained in an amount of 10 to 85 mol % [hereinafter this thermotropic liquid crystal polyester is sometimes referred to as "thermotropic liquid crystal polyester (A)"]; or a novel thermotropic liquid crystal polyester consisting essentially of a structural unit (4) represented by the following formula

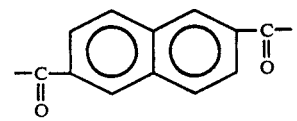

, the above structural unit (2), the above structural unit (3) and a structural unit (5) represented by the following formula

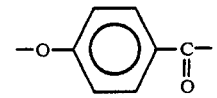

, said structural units (4) and (2) being contained in the same moles, the sum of said structural units (4) and (2) being 15 to 90 mol %, the sum of said structural units (3) and (5) being 10 to 85 mol % and the ratio of said structural unit (3) to the sum of said structural units (3) and (5) being at least 10 mol % [hereinafter this thermotropic liquid crystal polyester is sometimes referred to as "thermotropic liquid crystal polyester (B) "].

Another one of the above objects is achieved by providing a shaped article comprising the above thermotropic liquid crystal polyester (A) or (B).

Still another one of the above objects is achieved by providing a packaging material and container comprising at least one polyester selected from the group consisting of the above thermotropic liquid crystal polyester (A), the above thermotropic liquid crystal polyester (B) and a polyester consisting essentially of a structural unit (6) represented by the following formula

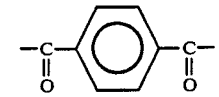

, the above structural unit (2 ) the above structural unit (3 ) and the above structural unit (5 ), said structural unit (6) and said structural unit (2) being contained in substantially the same moles, the sum of said structural units (6) and (2) being 15 to 90 mol %, the sum of said structural units (3) and (5) contained being 10 to 85 mol %, and the ratio of said structural unit (3) to the sum of said structural units (3) and (5) being at least 10 mol % [hereinafter this polyester is sometimes referred to as "polyester (C) "].

DETAILED DESCRIPTION OF THE PREFERRED EMBODIMENTS

The structural unit (1) of the thermotropic liquid crystal polyester (A) of the present invention is derivable from an aromatic dicarboxylic acid and is, concretely, terephthaloyl group and/or naphthalene-2,6-dicarbonyl group. The structural unit (4) of the thermotropic liquid crystal polyester (B) of the present invention is naphthalene-2,6-dicarbonyl group. The structural unit (6) of the polyester (C) is terephthaloyl group. Part of the structural unit (1), (4) or (6), preferably not more than 20 mol % of the foregoing may be replaced by other dicarboxylic acid component. Examples of the other dicarboxylic acid component are units derivable from isophthalic acid, 2,7-naphthalenedicarboxylic acid, 1,4-naphthalenedicarboxylic acid, 1,4-cyclohexanedicarboxylic acid, succinic acid, adipic acid, sebacic acid and like dicarboxylic acids. Further, part of structural unit (1), (4) or (6) can be replaced by a structural unit derivable from a multi-valent carboxylic acid such as trimellitic acid, trimesic acid or pyromellitic acid within an amount that assures melt-processability of the resulting polyester.

The structural unit (2) in the thermotropic liquid crystal polyester (A), thermotropic liquid crystal polyester (B) and polyester (C) is ethylenedioxy group, part of which, preferably not more than 20 mol % of which, may be replaced by glycol components other than ethylene glycol. Examples of said glycol components are 1,2-propanediol, 1,3-propanediol, 1,4-butanediol, 1,3-butanediol, 2-methyl-1,3-propanediol, 1,5-pentanediol, neopentyl glycol, 1,6-hexanediol, 3-methyl-1,5-pentanediol, 1,4-cyclohexanedimethanol, diethylene glycol, triethylene glycol and o-, m- or p-xylylene glycol. Part of the structural unit (2) can be replaced by a structural unit derivable from a polyhydric alcohol such as glycerol, trimethylolpropane, triethylolpropane or pentaerythritol, within an amount that assures melt processability of the resulting polyester.

The structural units (1) and (2) in the thermotropic liquid crystal polyester (A) are, generally, introduced into the thermotropic liquid crystal polyester (A) by utilizing as one of the starting materials the polyester obtained by reaction of a terephthalic acid or its ester-forming derivatives and ethylene glycol as principal components; reaction of 2,6-naphthalenedicarboxylic acid or its ester-forming derivatives and ethylene glycol as principal components; or reaction of a mixture of terephthalic acid and 2,6-naphthalenedicarboxylic acid or their ester-forming derivatives and ethylene glycol as principal components. The structural units (2) and (4) in the thermotropic liquid crystal polyester (B) are, generally, introduced into the thermotropic liquid crystal polyester (B) by utilizing as one of the starting materials a polyethylene naphthalate-based polyester obtained by reaction of 2,6-naphthalenedicarboxylic acid or its ester-forming derivatives and ethylene glycol as principal components. The structural units (2) and (6) in the polyester (C) are, generally, introduced into the polyester (C) by utilizing as one of the starting materials a polyethylene terephthalate-based polyester obtained by reaction of terephthalic acid or its ester-forming derivatives and ethylene glycol as principal components.

The above polyethylene terephthalate, polyethylene naphthalate or their copolymers used in the production of the thermotropic liquid crystal polyester (A), the above polyethylene naphthalate-based polyester used in the production of the thermotropic liquid crystal polyester (B) and the above polyethylene terephthalate-based polyester used in the production of the polyester (C) can be produced by known processes having been established for producing conventional polyesters. The known processes include one which comprises esterifying a dicarboxylic acid with a glycol and then conducting polycondensation and one which comprises conducting transesterification of a dicarboxylate and a glycol and then conducting polycondensation. It sometimes gives good results, to use on this occasion an esterification catalyst, transesterification catalyst, polycondensation catalyst, stabilizer and the like. Known catalysts and stabilizers in the production of conventional polyesters, in particular polyethylene terephthalate, can be used for this purpose. Examples of the catalysts accelerating the above reactions are compounds of metals such as sodium, magnesium, calcium, zinc, manganese, tin, tungsten, germanium, titanium and antimony; and examples of the stabilizers are phosphorus compounds such as phosphoric acid, phosphoric acid esters, phosphorous acid and phosphorous acid esters. There can, as required, be added other additives such as a color, ultraviolet absorber, light stabilizer, antistatic agent, flame retardent and crystallization accelerator. There are no specific restrictions with respect to the degree polymerization of the starting material polyesters used for producing the thermotropic liquid crystal polyester (A), thermotropic liquid crystal polyester (B) or polyester (C), but it is preferred that they have an logarithmic viscosity as measured in a 1/1 by weight mixed phenol/tetrachloroethane mixed solvent at 30° C. of 0.01 to 1.5 dl/g.

The sum of the structural units (1) and (2) in the thermotropic liquid crystal polyester (A), that of the structural units (2) and (4) in the thermotropic liquid crystal polyester (B) and that of the structural units (2) and (6) in the polyester (C) are all within the range of from 15 to 90 mol % and preferably within the range of from 25 to 85 mol %, more preferably within the range of from 30 to 80 mol %.

The structural unit (3) in the thermotropic liquid crystal polyester (A), the thermotropic liquid crystal polyester (B) and the polyester (C) is 6-oxy-2-naphthoyl groups. Part, preferably not more than 10 mol %, of the structural unit (3) may be replaced by other hydroxy carboxylic acid component. Examples of said hydroxy carboxylic acid component are oxynaphthoyl groups such as 7-oxy-2-naphthoyl group, 4-oxy-1-naphthoyl group and 5-oxy-1-naphthoyl group.

The structural unit (5) in the thermotropic liquid crystal polyester (B) and the polyester (C) is p-oxybenzoyl group. Part, preferably not more than 10 mol %, of the structural unit (5) may be replaced by other hydroxy carboxylic acid component. Examples of the other hydroxy carboxylic acid component are oxybenzoyl groups which may be substituted, such as 4-oxybenzoyl group, 4-oxy-3-chlorobenzoyl group, 4-oxy-3,5-dimethylbenzoyl group, 4-oxy-3-methylbenzoyl group, and the like.

It is suitable that the structural unit (3) be contained in the thermotropic liquid crystal polyester (A) in an amount of 10 to 85 mol %, preferably 15 to 75 mol %, more preferably 20 to 70 mol %. Melt polymerization becomes difficult, formability is markedly impaired and other troubles occur with a content of the structural unit (3) exceeding 85 mol %, while with the content being less than 10 mol % the obtained polyester does not form thermotropic liquid crystal and its gas barrier property decreases to a large extent, which are not preferred.

In the thermotropic liquid crystal polyester (B) and the polyester (C), it is suitable that the sum of the structural units (3) and (5) be 10 to 85 mol %, preferably 15 to 75 mol %, more preferably 20 to 70 mol %. If the sum exceeds 85 mol %, the melt polymerization will become difficult and the formability of the obtained polyester will be markedly impaired. If the sum is less than 10 mol %, the obtained polyester will exhibit insufficient gas barrier property. It is necessary that the ratio of the structural unit (3) to the sum of the structural units (3) and (5) be at least 10 mol %, which assures the obtained polyester yielding shaped articles having excellent oxygen gas barrier properties.

The structural unit (3) in the thermotropic liquid crystal polyester (A) and the structural units (3) and (5) in the thermotropic liquid crystal polyester (B) and the polyester (C) are, generally, introduced in the polymer molecules by utilizing corresponding acyloxy carboxylic acids as starting materials. Preferred examples of the acyloxy carboxylic acids are acetoxy carboxylic acids obtained by reacting corresponding hydroxy carboxylic acids with acetic anhydride.

The thermotropic liquid crystal polyesters (A) and (B) are capable of forming liquid crystal (i.e. exhibiting optical anisotropy) in the melt phase. The polyester (C) is, in most cases, capable of forming liquid crystal in the melt phase. The optical anisotropy in the melt phase can be confirmed by a method known to those skilled in the art. That is, a specimen foil, preferably one having a thickness of about 5 $\mu$m to about 20 $\mu$m, is sandwiched between a pair of cover glasses, and observed, while being placed under a crossed nicol and heated at a constant temperature-elevating rate, with a polarization microscope equipped with a heating device for light transmission at a certain temperature or above. To make surer the observation of the transmission of polarized light, a small pressure may be applied at high temperature on the specimen sandwiched between cover glasses, or the top cover glass may be shifted back and forth. The temperature at which polarized light starts transmission in this observation is the transition temperature to an optically anisotropic melt phase. The transition temperature is preferably not higher than 350° C., more preferably not higher than 300° C. from the viewpoint of good melt processability. It is difficult to determine the transition temperature to an optically anisotropic melt phase of the thermotropic liquid crystal polyesters (A) and (B) with a differential scanning calorimeter as used for determining that of conventional thermotropic liquid crystal polyesters. Thus, when differential scanning calorimetry is conducted on the thermotropic liquid crystal polyesters (A) and (B), there often occur the cases where distinct endothermic peak is not observed depending on the monomer contents in the polyesters or, if an endothermic peak is ever observed it is not always based on a transition from crystal to liquid crystal. In the thermotropic liquid crystal polyester (A), the endothermic peak becomes smaller as the content of the structural unit (3) increases and in most cases disappears with the content exceeding 35 mol %. In the thermotropic liquid crystal polyester (B), the endothermic peak becomes smaller as the contents of the structural units (3) and (5) increase and often disappears when the sum of the contents of the structural units (3) and (5) exceeds 35 mol %.

The thermotropic liquid crystal polyester (A) is produced for example by first effecting acidolysis of polyethylene terephthalate, polyethylene naphthalate, a copolymer or mixture of the foregoing with 6-acyloxy-2-naphthoic acid to prepare the desired polyester fragment and then increasing the degree of polymerization of the polyester fragment.

The thermotropic liquid crystal polyester (B) is produced for example by first effecting acidolysis of polyethylene naphthalate-based polyester with 6-acyloxy-2-naphthoic acid and p-acyloxybenzoic acid to prepare the desired polyester fragment and then increasing the degree of polymerization of the polyester fragment. The polyester (C) is produced for example by first effecting acidolysis of polyethylene terephthalate-based polyester with 6-acyloxy-2-naphthoic acid and p-acyloxybenzoic acid to prepare the desired polyester fragment and then increasing the degree of polymerization of the polyester fragment.

In the above processes for the production of the thermotropic liquid crystal polyesters (A) and (B) and the polyester (C), the acidolysis of the first step is generally effected at 250° to 300° C. and under an atmosphere of an inert gas such as nitrogen, argon or carbon dioxide. In most cases, it is preferred to use 6-acetoxy-2-naphthoic acid and p-acetoxybenzoic acid for the 6-acyloxy-2-naphthoic acid and p-acyloxybenzoic acid, respectively.

6-Hydroxy-2-naphthoic acid can be used as a starting material compound instead of 6-acyloxynaphthoic acid in the above process for the production of the thermotropic liquid crystal polyesters (A) and (B) or that of the polyester (C). p-Hydroxybenzoic acid can be used as a starting material instead of P-acyloxybenzoic acid in the above process for the production of the thermotropic liquid crystal polyester (B) or that of the polyester (C). In these cases, the hydroxy carboxylic acid (i.e. 6-hydroxy-2-naphthoic acid and/or P-hydroxybenzoic acid), which is the starting material, is reacted with a lower aliphatic acid anhydride, preferably acetic anhydride, to convert (effect acylation) substantially all the hydroxyl groups to acyloxy groups, preferably acetoxy groups, and the resulting acyl ester is, without being isolated, reacted with a prescribed starting material polyester, to give the desired thermotropic liquid crystal polyester (A), thermotropic liquid crystal polyester (B) or polyester (C). Here the starting material polyester can be added to the reaction system at an optional point time before and after the acylation reaction of 6-hydroxy-2-naphthoic acid and/or p-hydroxybenzoic acid. Where in the production process utilizing a hydroxy carboxylic acid 6-hydroxy-2-naphthoic acid alone or a mixture of 6-hydroxy-2-naphthoic acid and a small amount of p-hydroxybenzoic acid is used, it is preferred to add to the reaction system a solvent, particularly acetic acid, that does not impair the intended acylation reaction and has a boiling point of about 100° C. to about 200° C. for the purpose of preventing deposition in the system of 6-acyloxy-2-naphthoic acid that forms by the acylation, the deposition rendering it difficult to stir the reaction system.

During the acidolysis reaction of 6-acyloxy-2-naphthoic acid or a mixture thereof with p-acyloxybenzoic acid and a starting material polyester, lower aliphatic acids that form are mostly evaporated off from the system. Then, the reaction mixture remaining in the system is heated at 250° to 350° C. in vacuo to evaporate off the lower aliphatic acids and to increase the degree of polymerization of the reaction product to a suitable one, preferably to an logarithmic viscosity of at least 0.1 dl/g, suitable for molding or forming the desired shaped article. Here the polymerization temperature is preferably at least 270° C. in view of reaction rate and not higher than 350° C. to suppress the decomposition of the polyester and more preferably in a range of 270° to 320° C. It is preferred to gradually reduce the pressure at this polymerization stage to eventually not more than 1 mmHg, more preferably not more than 0.5 mmHg. Solid phase polymerization or the like known to those skilled in the art can also be employed to further increase the molecular weight.

The thermotropic liquid crystal polyester (A) or (B) or polyester (C) generally has an logarithmic viscosity as determined in pentafluorophenol at 60° C. of at least 0.1 dl/g and preferably at least 0.3 dl/g, more preferably at least 0.5 dl/g in view of the mechanical property of the obtained shaped articles. Although the inherent viscosity has no critical upper limit, it is preferably not more than 3.0 dl/g, more preferably not more than 2.0 dl/g in view formability and the like.

The contents of the structural units constituting the thermotropic liquid crystal polyesters (A) and (B) and polyester (C) are determined by NMR spectrometry on a solution prepared by dissolving the specimen polyester in an appropriate solvent. The contents thus determined are generally substantially the-same as the ratios of starting materials fed.

The thermotropic liquid crystal polyesters (A) and (B) give, when their melt are rapidly cooled, shaped articles having markedly low degree of crystallinity of generally not more than 20% as determined by X-ray diffraction method, thus differing from known thermotropic liquid crystal polymers. The degree of crystallinity decreases with increasing ratio of the structural units (3) and (5) in the polyester. Shaped articles such as film obtained from the thermotropic liquid crystal polyester (A) or (B) can therefore be heat stretched uniaxially and biaxially, thus being different from thermotropic liquid crystal polyesters so far proposed. In most cases the film can be heat stretched by at least 2×2 times or at least 3×3 times simultaneously or successively. In addition, shaped articles such as film obtained from the thermotropic liquid crystal polyester (A) or (B) are excellent in gas barrier properties both before and after such heat stretching. These characteristic features never develop in those thermotropic liquid crystal polyesters comprising as the hydroxy aromatic carboxylic acid component one from p-hydroxybenzoic acid or its ester-forming derivatives alone or two types of hydroxybenzoic acids or their ester-forming derivatives alone. Shaped articles obtained from the thermotropic liquid crystal polyester (A) or (B) have, in spite of their low degree of crystallinity, markedly high mechanical properties such as flexural strength and flexural modulus than those obtained from thermotropic liquid crystal polyesters so far proposed.

The thermotropic liquid crystal polyesters (A) and (B) can be melt processed into various shaped articles by known processes for conventional polyesters and are particularly suited for forming sheets and films thanks to their capability to be heat-stretched. Hollow shaped articles can also be produced by extrusion blow molding or what is known as direct blowing, injection blow molding, biaxial stretching blow molding or like processes. Films obtained from the thermotropic liquid crystal polyester (A) are transparent when they are thin, and for example most extruded films having a thickness of 25 μm have sufficient transparency. Capability of yielding such transparent films is also the feature of the thermotropic liquid crystal polyester (A) that is never possessed by conventional thermotropic liquid crystal polyesters.

The thermotropic liquid crystal polyester (A) or (B) can be laminated with other polymers, e.g. polyolefin resins such as polyethylene and polypropylene, polyester resins such as polybutylene terephthalate, polyethylene terephthalate and polyethylene naphthalate and polyamide resins such as nylon. Thus, laminated films, sheets, tubes and the like can be produced by co-extrusion, dry lamination, sandwich lamination or like processes, and laminated containers such as cups and bottles can be produced by injection molding, blow molding, biaxially stretching blow molding, vacuum forming, compression molding or like molding or forming processes.

Shaped articles obtained from the thermotropic liquid crystal polyester (A) or (B) have excellent oxygen gas barrier properties, which are 20 to 400 times those of polyethylene terephthalate. Moreover, the excellent oxygen gas barrier properties are very little dependent on humidity. For example, the thermotropic liquid crystal polyesters (A) and (B) each gives a rapidly quenched film having an oxygen permeability of not more than 20 ml . 20 μm/m$^2$.day.atm. The oxygen gas barrier property thus initially obtained sometimes increases by heat treating the shaped article.

Accordingly, the thermotropic liquid crystal polyesters (A) and (B) have moldability and formability far improved over conventional thermotropic liquid crystal polyesters and stretchability, as well as excellent oxygen gas barrier properties and are hence used suitably for various packaging materials and containers for which high oxygen barrier properties are required. The thermotropic liquid crystal polyesters (A) and (B) therefore can widely be used for the gas-barrier packaging of for example foods, medicines, cosmetics, textiles, industrial chemicals and the like. The containers or packaging materials comprising the thermotropic liquid crystal polyester (A) or (B) generally have an oxygen permeability as measured on its wall surface at 20° C. of not more than 20 ml.20 μm/m$^2$.day.atm.

The term "containers" used herein means shaped articles principally suited for use in packaging foods, medicines and the like, and the "containers" include sheets and films, as well as bottles, trays, cups, bags and like bottomed containers.

Further the thermotropic liquid crystal polyesters (A) and (B) can be used for producing fibers and as coating agents and also, utilizing their low temperature fluidity which is specifically different from conventional thermotropic liquid crystal polyesters, as adhesives and paints.

The thermotropic liquid crystal polyester (C) is produced by a method comprising reacting a polyethylene terephthalate consisting essentially of a structural unit (6) and a structural unit (2), hydroxy aromatic carboxylic acids consisting essentially of 6-hydroxy-2-naphthoic acid and p-hydroxybenzoic acid and a lower aliphatic acid anhydride of from 1.02 to 1.50 mole equivalent based on the hydroxy aromatic carboxylic acids in the presence of solvent at a temperature ranging from 100° C. to 150° C. till the conversion of the hydroxy aromatic carboxylic acids reaches not less than 95 mol % and reacting the obtained reaction mixture at a temperature higher than 150° C.

The polyester (C) is very homogeneous because the contamination to high melting point components such as homopolymer of hydroxy aromatic carboxylic acids can be depressed and sequential randomness of structural units in molecule can be increased. According to said method, the reaction time can be reduced and the polyester (C) having a high degree of polymerization can be obtained easily.

As the lower aliphatic acid anhydride are used preferably anhydride of lower aliphatic acid having 1 to 8 carbon atoms, for example, acetic anhydride, propionic anhydride, monochloroacetic anhydride, dichloroacetic anhydride, trichloroacetic anhydride, succinic anhydride, glutaric anhydride, maleic anhydride, butyric anhydride, valeric anhydride, and so on. In view of price and boiling point preferable in reaction operation, acetic anhydride is used most preferably. The lower aliphatic acid anhydride should be used in an amount of from 1.02 to 1.50 mole equivalent based on the hydroxy aromatic carboxylic acids. Where the amount is below 1.02 mole equivalent, it takes long time to obtain the desired polyester (C), or the degree of polymerization cannot be sufficiently increased. Where the amount is beyond 1.50 mole equivalent, the obtained polyester colors remarkably.

As the solvent is used preferably organic compound which has boiling point of from 100° to 300° C. and solubility of the 6-acyloxy-2-naphthoic acid corresponding to the product obtained from the employed lower aliphatic acid anhydride and 6-hydroxy-2-naphthoic acid as solute at 25° C. being not less than 15 g(solute)/100 g(solvent) and does not have an evil effect on the acylation, acidolysis, and polymerization. The preferable examples of solvent are a lower aliphatic acid such as acetic acid, propionic acid, butyric acid, isobutyric acid, trimethylacetic acid, etc.; aromatic hydrocarbon such as toluene, xylene, pseudocumene, diphenylmethane, biphenyl, diphenyl ether, diphenyl sulfide, diphenyl sulfone, etc. In view of boiling point, price and easiness of recovery, acetic acid is used most preferably. The reaction system should be kept in the condition of suspension or solution in the presence of said solvent so that the system can be sufficiently stirred at least till the system reaches the molten state. From this point of view, solvent is used preferably in an amount of from 0.5 to 5 times by weight based on the hydroxy aromatic carboxylic acids.

In the above method, first, a reaction among the polyethylene terephthalate, hydroxy aromatic carboxylic acids and lower aliphatic acid anhydride is caused in the presence of solvent at 100° to 150° C. At this stage is mainly caused acylation, that is, hydroxy aromatic carboxylic acids react with lower aliphatic acid anhydride to yield the corresponding acyloxy aromatic carboxylic acids. In this acylation reaction, the system should be maintained at a temperature not higher than 150° C. till the conversion of the hydroxy aromatic carboxylic acids reaches not less than 95 mol %. Where the system is at a temperature higher than 150° C. before the conversion of the hydroxy aromatic carboxylic acids is beyond 95 mol %, the acylation reaction proceeds no more and evil effects are produced on the reaction velocity in the following polymerization stage and the degree of the obtained polyester. The reaction time for which the conversion of hydroxy aromatic carboxylic acids reaches 95 mol % is usually from 0.5 to 4 hours, although it changes depending on the reaction conditions such as reaction temperature, etc. The conversion of hydroxy aromatic carboxylic acids can be determined, for example, by measuring the residual amount of unreacted hydroxy aromatic carboxylic acids by high performance liquid chromatography, it can be also determined by 1H-NMR spectrometry. Where solvent is absent in this stage, as acylation reaction proceeds, the produced acyloxy naphthoic acid solidifies and the reaction system becomes heterogeneous remarkably and so the reaction can proceed smoothly no more as the case may be. In such heterogeneous system, acidolysis reaction at a temperature beyond 150° C. does not proceed smoothly as well as acylation reaction, homopolyester of acyloxy naphthoic acid produces remarkably, and the resulting polyester has the inferior randomness and contains high boiling point components. The acylation reaction is preferably carried out in an atmosphere of inert gas such as nitrogen, argon, carbon dioxide, etc. under near atmospheric pressure or higher pressure with stirring.

The reaction mixture obtained in acylation which is carried out at a temperature not higher than 150° C. is subjected to a reaction which is carried out at a temperature beyond 150° C. This reaction consists of acidolysis reaction (the second stage) which is generally carried out at a temperature ranging from 150° to 230° C. under near atmospheric pressure or higher pressure and polymerization reaction (the third stage) which is generally carried out at a temperature ranging from 250° to 350° C. under pressure ranging from atmospheric pressure to reduced pressure.

During the acidolysis reaction, the polyethylene terephthalate is acidolysized mainly by the produced acyloxy aromatic carboxylic acids to yield polyester fragments. The acidolysis reaction is preferably carried out in an atmosphere of inert gas such as nitrogen, argon, carbon dioxide, etc. at a temperature ranging from 150° to 230° C. under pressure from near atmospheric pressure or higher pressure for from 30 minutes to 5 hours with stirring. Controlling the reaction temperature to be not higher than 230° C., the formation of high melting point polyester rich in acyloxy aromatic carboxylic acid components is suppressed, and the obtained polyester becomes more homogeneous. And carrying a reaction at a temperature beyond 150° C. for not shorter than 30 minutes, the acidolysis reaction of the polyethylene terephthalate proceeds sufficiently, the randomness of the obtained polyester is increased, and the resulting polyester has excellent homogeneity and formability.

In the polymerization reaction, it is preferable to increase the temperature from 230° C. to a temperature ranging from 250° to 350° C. with stirring in an atmosphere of inert gas such as nitrogen argon, carbon dioxide, etc. At this temperature increasing stage, the greater part of theoretical amount of the formed lower aliphatic acid is usually evaporated off from the system. And after the reaction temperature reaches a temperature ranging from 260° to 270° C., it is preferable to gradually increase the degree of vacuum up to not higher than 1 mmHg, preferably not higher than 0.5 mmHg finally over a period of at least 1 hour, preferably not less than 2 hours so as to evaporate off the lower aliphatic acid. In this way, it is preferable to increase the degree of polymerization of polyester to a suitable one, preferably to a logarithmic viscosity of at least 0.1 dl/g. As the polymerization temperature under such reduced pressure, it is preferable to employ a temperature of at least 270° C. in view of reaction velocity and to employ a temperature of not higher than 350° C. in view of suppressing decomposition of the produced polyester. It is most preferable to employ a temperature ranging from 270° to 320° C.

The polyester (C) is, different from other known thermotropic liquid crystal polyesters, excellent in heat processability and hence desirably used for packaging materials and containers having various shapes, which, although sometimes inferior to those obtained from the thermotropic liquid crystal polyester (A) or (B), have a gas barrier property of markedly high level. For example containers or packaging materials comprising the polyester (C) generally have an oxygen permeability as measured on its wall surface at 20° C. of not more than 20 ml . 20 $\mu$m/m$^2$.day.atm. These containers or packaging materials thus have oxygen gas barrier properties 20 to 400 times as high as those from polyethylene terephthalate. Thanks also to a very small humidity dependency of its oxygen gas barrier properties, the polyester (C) is suitably used for packaging materials and containers for which high oxygen gas barrier properties are required. These packaging materials and containers are therefore widely used for gas-barrier packaging of for example foods, medicines, cosmetics, textiles, industrial chemicals and the like.

Containers and packaging materials comprising the polyester (C) can be obtained, utilizing the above-described excellent processability of the polyester, by injection molding, blow molding, biaxial stretching blow molding, vacuum forming, compression molding or like molding or forming processes. The containers and packaging materials can be of various shapes including trays prepared from sheets by vacuum or pressure forming, shapes prepared by deep drawing an unstretched sheet, shapes prepared by direct blowing or biaxial stretching blowing parisons obtained by injection molding or parisons prepared by providing a pipe with a bottom, and the like.

The containers or packaging materials comprising the polyester (C) includes, in addition to those formed of the polyester alone, those comprising a blend of the polyester and another resin, comprising multilayered structure comprising layers of other resins and those coated. Examples of the other resins are polyolefin resins such as polyethylene and polypropylene, polyester resins such as polyethylene terephthalate, polybutylene terephthalate and polyethylene naphthalate and polyamide resins such as nylon.

Having generally described this invention, a further understanding can be obtained by reference to certain specific examples which are provided herein for purpose of illustration only and are not intended to be limitative of this invention unless otherwise specified.

Various properties in the Examples were determined by the following methods.

1) Logarithmic viscosity ($\eta_{inn}$)

Determined at 60° C. on a 0.1 g/dl solution of specimen in pentafluorophenol.

$\eta_{inn} = \ln (t_1/t_0)/c$ wherein $\eta_{inn}$ means the ligarithmic viscosity in dl/g, $t_0$ the flow down time (sec) of the solvent, $t_1$ that of the specimen solution and c the concentration (0.1 g/dl) of specimen in the solution.

2) Melting point ($T_m$) and glass transition temperature ($T_g$)

A specimen obtained by rapid quenching of the polyester to test is tested with a differential scanning calorimeter (DSC; TA-3000; made by Mettler) at a temperature elevating rate of 10° C./min.

3) Oxygen gas permeability ($PO_2$)

A heat-pressed film, a stretched film or a film laminated with PET and stretched of specimen is tested with a gas transmission rate tester (OX-TRAN 10/50A; made by Modern Control Co.) at 20° C., 0%, 65% (unless otherwise specified) or 100% RH. The results are expressed in ml . 20 $\mu$m/m$^2$.day.atm.

4) Stretchability

A specimen is formed at 260° to 290° C. into a heat-pressed film having a thickness of about 100 $\mu$m. The film is biaxially stretched by 3×3 times at 100° to 240° C. with a biaxially stretching apparatus made by Shibayama Kagaku Kiki Seisakusho Co. The results of the stretchability evaluated are expressed as:

Good: a uniform biaxially stretched film is obtained; and

Unstretchable: no stretchability is observed and the film tested breaks.

5) Polymer composition

A specimen polymer is dissolved in trifluoroacetic acid and subjected to 500 MHz, $^1$H-NMR spectrometry (with JNM GX-500, made by JEOL Ltd.). The compositions obtained by the spectrometry were confirmed to be the same within analysis precision as those of starting materials fed.

Example 1 [Preparation example of thermotropic liquid crystal polyester (A)]

An 8-l reaction vessel equipped with a stirrer, a distillation column and a nitrogen gas inlet was charged with 975 g (4.0 moles) of a polyethylene naphthalate having an logarithmic viscosity as determined at 30° C. on its solution in a 1/1 by weight mixed phenol/tetrachloroethane solvent of 0.65 dl/g and 1,390 g (6.0 moles) of 6-acetoxy-2-naphthoic acid. The reaction system was substituted three times with nitrogen gas and the contents were heated with stirring at 290° C. for 1 hour with nitrogen gas flowing into the system, and, after the system had gradually been evacuated, reaction was further effected under a pressure of about 30 mmHg for about 2 hours. By this operation, about 90% of theoretical amount of acetic acid was distilled off. The reaction system was further evacuated and reaction was effected under a pressure of 1 mmHg or below for 5 hours, and the product polyester was withdrawn.

The thus obtained polymer was dissolved in trifluoroacetic acid and the solution was subjected to $^1$H-NMR spectrometry, to reveal that the ratio of the contents of structural units constituting the polymer, [structural unit (1)+structural unit (2)]/[structural unit (3)], was 57/43, which is substantially the same as the ratio of the amounts of starting materials fed. A minute specimen of the obtained polymer was heated in a heating device for microscope (TH-600; made by Linkam Co.) under a nitrogen atmosphere at a rate of 10° C./min and observed with a polarization microscope and under a crossed nicol. Then, the specimen started to transmit light at a temperature near 150° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 88° C. but no endothermic peak at all. The specimen was tested for degree of crystallinity by X-ray wide-angle scattering, to be found to have one of 8%. Next, a test specimen with a size of 75×15×2 mm was prepared from the polymer with an injection molding machine, TK14-1AP made by Tabata Kikai Co., at a cylinder temperature and mold temperature of 280° C. and 30° C. respectively and under an injection pressure of 800 kg/cm². The test specimen obtained was tested for flexural strength and flexural modulus according to JIS K7203, to give the following results (data in the direction of resin flow).
Flexural strength: 2,138 kg/cm²
Flexural modulus: 12.9×10⁴ kg/cm²

The polymer was melted and pressed at 280° C. and then rapidly quenched through a water-cooled cooling press to form a film having a thickness of about 100 μm. The film obtained was tested for oxygen gas permeability with a gas transmission tester, OX-TRAN 10/50A made by Modern Control Co. at 20° C. 65% RH to give one of 1.6 ml . 20 μm/m² .day.atm. A heat-pressed film having a thickness of about 100 μm and obtained in the same manner was subjected to 3×3 simultaneous biaxial stretching at a temperature of 150° C. through a biaxially stretching machine made by Shibayama Kagaku Kiki Seisakusho Co., to give a uniform film having a thickness of about 10 μm.

The ligarithmic viscosity and results by DSC of this polymer and the oxygen permeability and evaluation result of stretchability (3×3, simultaneous biaxial stretching) of the pressed film are shown in Table 1.

Example 2 [Preparation example of thermotropic liquid crystal polyester (A)]

Example 1 was repeated except for setting the moles ratio of polyethylene naphthalate/6-acetoxy-2-naphthoic acid to 50/50, to obtain a polyester. The obtained polymer was observed with the same apparatus as used in Example 1 under a crossed nicol. Then, the specimen started to transmit light at a temperature near 230° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 82° C. and a small endothermic peak at 235° C. The specimen was tested for degree of crystallinity by X-ray wide-angle scattering, to be found to have one of 11%. Next, a test specimen was prepared from the polymer by the same injection molding conditions as in Example 1 and tested for flexural strength and flexural modulus, to give the following results (data in the direction of resin flow).
Flexural strength: 2,046 kg/cm²
Flexural modulus: 12.1×10⁴ kg/cm²

The inherent viscosity and results by DSC of this polymer and the oxygen permeability and evaluation result of stretchability (3×3, simultaneous biaxial stretching) of the pressed film are shown in Table 1.

Example 3 [Preparation example of thermotropic liquid crystal polyester (A) ]

Example 1 was repeated except for setting the moles ratio of polyethylene naphthalate/6-acetoxy-2-naphthoic acid to 60/40, to obtain a polyester. The obtained polymer was observed with the same apparatus as used in Example 1 under a crossed nicol. Then, the specimen started to transmit light at a temperature near 250° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 80° C. and an endothermic peak at 252° C. Next, injection molding was conducted under the same conditions as in Example 1 and the obtained test specimen was tested for flexural strength and flexural modulus, to give the following results (data in the direction of resin flow).
Flexural strength: 1,844 kg/cm²
Flexural modulus: 10.8×10⁴ kg/cm²

The logarithmic viscosity and results by DSC of this polymer and the oxygen permeability and evaluation result of stretchability (3×3, simultaneous biaxial stretching) of the pressed film are shown in Table 1.

Example 4 [Preparation example of thermotropic liquid crystal polyester (A) ]

Example 1 was repeated except for setting the moles ratio of polyethylene naphthalate/6-acetoxy-2-naphthoic acid to 70/30, to obtain a polyester. The obtained polymer was observed with the same apparatus as used in Example 1 under a crossed nicol. Then, the specimen started to transmit light at a temperature near 150° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 93° C. but no endothermic peak at all. The specimen was also tested for degree of crystallinity by X-ray wide-angle scattering, to give one of 7%.

The logarithmic viscosity and results by DSC of this polymer and the oxygen permeability and evaluation result of stretchability (3×3, simultaneous biaxial stretching) of the pressed film are shown in Table 1.

Example 5 [Preparation example of thermotropic liquid crystal polyester (A)]

An 8-1 reaction vessel equipped with a stirrer, a distillation column and a nitrogen gas inlet was charged with 1,504 g (8.0 moles) of 6-hydroxy-2-naphthoic acid, 918 g (9.0 moles) of acetic anhydride, 484 g (2.0 moles) of a polyethylene naphthalate having an logarithmic viscosity as determined on its solution in a 1/1 by weight mixed phenol/tetrachloroethane solvent of 0.65 dl/g and 960 g (16.0 moles) of acetic acid as a reaction solvent. The reaction system was substituted three times with nitrogen gas and the contents were heated with stirring and under reflux for 2 hours with nigrogen gas flowing into the system. Thereafter, after the temperature of the system had been elevated up to 290° C. over about 3 hours, the system was gradually evacuated and reaction was further effected under a pressure of about 30 mmHg for about 2 hours. By this operation, about 95% of theoretical value of acetic acid and acetic anhydride was distilled off. The reaction system was further evacuated, and reaction was effected under a pressure of 1 mmHg or below for 1 hour, and the product polyester was withdrawn.

The obtained polymer was observed with the same apparatus as used in Example 1 under a crossed nicol. Then, the specimen started to transmit light at a temperature near 150° C., the amount of light transmitted increasing thereafter with temperature, and, eventually, remained forming optically anisotropic melt phase when the temperature reached 350° C. A specimen obtained by rapidly quenching the melt this polymer was analyzed by DSC at a temperature elevating rate of 10° C./min. The specimen showed a glass transition temperature at 97° C. but no endothermic peak at all. The specimen was also tested for degree of crystallinity by X-ray wide-angle scattering, to give one of 9%.

The logarithmic viscosity and results by DSC of this polymer and the oxygen permeability and evaluation result of stretchability (3×3, simultaneous biaxial stretching) of the pressed film are shown in Table 1.

Example 6 [Preparation example of thermotropic liquid crystal polyester (A)]

Example 5 was repeated except for changing the amounts of the starting materials and solvent to 564 g (3.0 moles) for 6-hydroxy-2-naphthoic acid, 367 g (3.6 moles) for acetic anhydride, 360 g (6.0 moles) for acetic acid and 1,694 g (7.0 moles) for the polyethylene naphthalate, to obtain a polyester. The obtained polymer was observed with the same apparatus as used in Example 1 under a crossed nicol. Then, the specimen started to transmit light at a temperature near 250° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 122° C. and an endothermic peak at 256° C.

The logarithmic viscosity and results by DSC of this polymer and the oxygen permeability and evaluation result of stretchability (3×3, simultaneous biaxial stretching) of the pressed film are shown in Table 1.

Example 7 [Preparation example of thermotropic liquid crystal polyester (A)]

Example 5 was repeated except for changing the amounts of the starting materials and solvent to 376 g (2.0 moles) for 6-hydroxy-2-naphthoic acid, 245 g (2.4 moles) for acetic anhydride, 240 g (4.0 moles) for acetic acid and 1,936 g (8.0 moles) for the polyethylene naphthalate, to obtain a polyester. The obtained polymer was observed with the same apparatus as used in Example 1 under a crossed nicol. Then, the specimen started to transmit light at a temperature near 255° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 122° C. and an endothermic peak at 258° C.

The logarithmic viscosity and results by DSC of this polymer and the oxygen permeability and evaluation result of stretchability (3×3, simultaneous biaxial stretching) of the pressed film are shown in Table 1.

Example 8 [Preparation example of thermotropic liquid crystal polyester (A)]

Example 1 was repeated except for using instead of the polyethylene naphthalate 4.0 moles of a polyethylene terephthalate having an logarithmic viscosity as determined at 30° C. on a solution in a 1/1 by weight mixed phenol/tetrachloroethane solvent of 0.70 dl/g and changing the polymerization temperature to 280° C., to obtain a polyester. The obtained polymer was observed with the same apparatus as used in Example 1 under a crossed nicol. Then, the specimen started to transmit light at a temperature near 180° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 82° C. but no endothermic peak at all. The specimen was also tested for degree of crystallinity by X-ray wide-angle scattering, to give one of 13%.

The logarithmic viscosity and results by DSC of this polymer and the oxygen permeability and evaluation result of stretchability (3×3, simultaneous biaxial stretching) of the pressed film are shown in Table 1.

Example 9 [Preparation example of thermotropic liquid crystal polyester (A)]

Example 3 was repeated except for using instead of the polyethylene naphthalate the same polyethylene terephthalate (6.0 moles) as used in Example 8 and changing the polymerization temperature to 280° C., to obtain a polyester. The obtained polymer was observed with the same apparatus as used in Example 1 under a crossed nicol. Then, the specimen started to transmit light at a temperature near 225° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 80° C. and an endothermic peak at 226° C.

The logarithmic viscosity and results by DSC of this polymer and the oxygen permeability and evaluation result of stretchability (3×3, simultaneous biaxial stretching) of the pressed film are shown in Table 1.

Example 10 [Preparation example of thermotropic liquid crystal polyester (A) ]

Example 5 was repeated except for using as starting materials and solvent 1,128 g (6.0 moles) of 6-hydroxy-2-naphthoic acid, 643 g (6.3 moles) of acetic anhydride, 720 g (12.0 moles) of acetic acid, 484 g (2.0 moles) of the polyethylene naphthalate and 384 g (2.0 moles) of the same polyethylene terephthalate as used in Example 8, to obtain a polyester. The obtained polymer was observed with the same apparatus as used in Example 1 under a crossed nicol. Then, the specimen started to transmit light at a temperature near 50° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 85° C. but no endothermic peak at all.

The logarithmic viscosity and results by DSC of this polymer and the oxygen permeability and evaluation result of stretchability (3×3, simultaneous biaxial stretching) of the pressed film are shown in Table 1.

test specimen with a size of 75×15×2 mm was prepared from the polymer with an injection molding machine, TK14-1AP made by Tabata Kikai Co., at a cylinder temperature and mold temperature of 280° C. and 30° C. respectively and under an injection pressure of 800 kg/cm². The test specimen obtained was tested for flexural strength and flexural modulus according to JIS K7203, to give the following results (data in the direction of resin flow).

Flexural strength: 2,254 kg/cm²
Flexural modulus: 13.3×10⁴ kg/cm²

TABLE 1

| Example | $\eta_{inh}$ (dl/g) | $T_g$ (°C.) | $T_m$ (°C.) | $PO_2$ (ml · 20 μm/m² · day · atm) | Stretchability (3 × 3 times) |
|---|---|---|---|---|---|
| 1 | 0.65 | 88 | — | 1.6 | good |
| 2 | 0.58 | 82 | 235 | 2.0 | good |
| 3 | 0.60 | 80 | 252 | 2.0 | good |
| 4 | 0.57 | 93 | — | 0.8 | good |
| 5 | 1.25 | 97 | — | 0.5 | good |
| 6 | 0.69 | 122 | 256 | 5.3 | good |
| 7 | 0.71 | 122 | 258 | 9.0 | good |
| 8 | 0.68 | 82 | — | 2.6 | good |
| 9 | 0.57 | 80 | 226 | 3.1 | good |
| 10 | 1.10 | 85 | — | 2.0 | good |

Example 11 [Preparation example of thermotropic liquid crystal polyester (B)]

An 8-1 reaction vessel equipped with a stirrer, a distillation column and a nitrogen gas inlet was charged with 975 g (4.0 moles) of a polyethylene naphthalate having an logarithmic viscosity as determined at 30° C. on its solution in a 1/1 by weight mixed phenol/tetrachloroethane solvent of 0.65 dl/g, 1,150 g (5.0 moles) of 6-acetoxy-2-naphthoic acid and 180 g (1.0 mole) of p-acetoxybenzoic acid. The reaction system was substituted three times with nitrogen gas and the contents were heated with stirring at 290° C. for 1 hour with nitrogen gas flowing into the system, and, after the system had gradually been evacuated, reaction was further effected under a pressure of about 30 mmHg for about 2 hours. By this operation, about 90% of theoretical amount of acetic acid was distilled off. The reaction system was further evacuated and reaction was effected under a pressure of 1 mmHg or below for 5 hours, and the product polyester was withdrawn.

The thus obtained polymer was dissolved in trifluoroacetic acid and the solution was subjected to ¹H-NMR spectrometry, to reveal that the ratio of the contents of structural units constituting the polymer, [structural unit (4)+structural unit (2)]/[structural unit (3)+structural unit (5)], was 57/43, which is substantially the same as the ratio of the amounts of starting materials fed. A minute specimen of the obtained polymer was heated in a heating device for microscope (TH-600; made by Linkam Co.) under a nitrogen atmosphere at a rate of 10° C./min and observed with a polarization microscope and under a crossed nicol. Then, the specimen started to transmit light at a temperature near 160° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 86° C. but no endothermic peak at all. The specimen was also tested for degree of crystallinity by X-ray wide-angle scattering, to be found to have one of 10%. Next, a The polymer was melt pressed at 280° C. and then rapidly quenched through a water-cooled cooling press to form a film having a thickness of about 100 μm. The film obtained was tested for oxygen gas permeability with a gas transmission tester, OX-TRAN 10/50A made by Modern Control Co. at 20° C, 65% RH, to give one of 1.2 ml . 20 μm/m².day.atm. A heat-pressed film having a thickness of about 100 μm and obtained in the same manner was subjected to 3×3 simultaneous biaxial stretching at a temperature of 150° C. through a biaxially stretching machine made by Shibayama Kagaku Kiki Seisakusho Co., to give a uniform film having a thickness of about 10 μm.

The logarithmic viscosity and results by DSC of this polymer and the oxygen permeability and evaluation result of stretchability (3×3, simultaneous biaxial stretching) of the pressed film are shown in Table 2.

Example 12 [Preparation example of thermotropic liquid crystal polyester (B)]

Example 11 was repeated except for setting the moles ratio of polyethylene naphthalate/6-acetoxy-2-naphthoic acid/p-acetoxybenzoic acid to 40/30/30, to obtain a polyester. The obtained polymer was observed with the same apparatus as used in Example 11 under a crossed nicol. Then the specimen started to transmit light at a temperature near 150° C., the amount of light transmitted increasing thereafter with temperature, and, eventually, remained forming optically anisotropic melt phase when the temperature reached 350° C. The polymer was analyzed by DSC in the same manner as in Example 11, and found to show a glass transition temperature at 81° C. but no endothermic peak at all. The polymer was also tested for degree of crystallinity in the same manner as in Example 11, to be found to have one of 11%. Injection molding was next conducted under the same conditions as in Example 11 and the obtained specimen was tested for flexural strength and flexural modulus, to give the following results (data in the direction of resin flow).

Flexural strength: 2,134 kg/cm²
Flexural modulus: 12.7×10⁴ kg/cm²

The logarithmic viscosity and results by DSC of this polymer and the oxygen permeability and evaluation result of stretchability (3×3, simultaneous biaxial stretching) of the pressed film are shown in Table 2.

Example 13 [Preparation example of thermotropic liquid crystal polyester (B)]

Example 11 was repeated except for setting the moles ratio of polyethylene naphthalate/6-acetoxy-2-naphthoic acid/p-acetoxybenzoic acid to 40/10/50, to obtain a polyester. The obtained polymer was observed with the same apparatus as used in Example 11 under a crossed nicol. Then the specimen started to transmit light at a temperature near 140° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 75° C. but no endothermic peak at all. The polymer was tested for degree of crystallinity in the same manner as in Example 11, to show one of 12%. Injection molding was next conducted under the same conditions as in Example 11 and the obtained test specimen was tested for flexural strength and flexural modulus, to give the following results (data in the direction of resin flow).

Flexural strength: 2,055 kg/cm$^2$
Flexural modulus: 12.3×10$^4$ kg/cm$^2$

The logarithmic viscosity and results by DSC of this polymer and the oxygen permeability and evaluation result of stretchability (3×3 simultaneous biaxial stretching) of the pressed film are shown in Table 2.

Example 14 [Preparation example of thermotropic liquid crystal polyester (B)]

Example 11 was repeated except for setting the moles ratio of polyethylene naphthalate/6-acetoxy-2-naphthoic acid/p-acetoxybenzoic acid to 30/60/10, to obtain a polyester. The obtained polymer was observed with the same apparatus as used in Example 11 under a crossed nicol. Then the specimen started to transmit light at a temperature near 160° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 89° C. but no endothermic peak at all. The specimen was also tested for degree of crystallinity in the same manner as in Example 11, to give one of 8%.

The logarithmic viscosity and results by DSC of this polymer and the oxygen permeability and evaluation result of stability (3×3, simultaneous biaxial stretching) of the pressed film are shown in Table 2.

Example 15 [Preparation example of thermotropic liquid crystal polyester (B)]

Example 11 was repeated except for setting the moles ratio of polyethylene naphthalate/6-acetoxy-2-naphthoic acid/p-acetoxybenzoic acid to 30/35/35, to obtain a polyester. The obtained polymer was observed with the same apparatus as used in Example 11 under a crossed nicol. Then the specimen started to transmit light at a temperature near 150° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 80° C. but no endothermic peak at all. The specimen was also tested for degree of crystallinity in the same manner as in Example 11, to give one of 10%.

The logarithmic viscosity and results by DSC of this polymer and the oxygen permeability and evaluation result of stretchability (3×3, simultaneous biaxial stretching) of the pressed film are shown in Table 2.

Example 16 [Preparation example of thermotropic liquid crystal polyester (B) ]

Example 11 was repeated except for setting the moles ratio of polyethylene naphthalate/6-acetoxy-2-naphthoic acid/p-acetoxybenzoic acid to 30/10/60, to obtain a polyester. The obtained polymer was observed with the same apparatus as used in Example 11 under a crossed nicol. Then the specimen started to transmit light at a temperature near 150° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 72° C. but no endothermic peak at all. The specimen was also tested for degree of crystallinity in the same manner as in Example 11, to give one of 14%.

The logarithmic viscosity and results by DSC of this polymer and the oxygen permeability and evaluation result of stretchability (3×3, simultaneous biaxial stretching) of the pressed film are shown in Table 2.

Example 17 [Preparation example of thermotropic liquid crystal polyester (B)]

An 8-1 reaction vessel equipped with a stirrer, a distillation column and a nitrogen gas inlet was charged with 1,316 g (7.0 moles) of 6-hydroxy-2-naphthoic acid, 138 g (1.0 mole) of p-hydroxybenzoic acid, 918 g (9.0 moles) of acetic anhydride, 484 g (2.0 moles) of a polyethylene naphthalate having an logarithmic viscosity as determined at 30° C. on its solution in a 1/1 by weight mixed phenol/tetrachloroethane solvent of 0.65 dl/g and 960 g (16.0 moles) of acetic acid as a reaction solvent. The reaction system was substituted three times with nitrogen gas and the contents were heated with stirring at 290° C. under reflux for about 2 hours with nitrogen gas flowing into the system. Thereafter, the system was heated to 290° C. over about 3 hours, then gradually evacuated and subjected to further reaction under a pressure of about 30 mmHg for about 2 hours. By this operation, about 95% of theoretical amount of acetic acid and acetic anhydride was distilled off. The reaction system was further evacuated and reaction was effected under a pressure of 1 mmHg or below for 1 hour, and the product polyester was withdrawn.

The obtained polymer was observed with the same apparatus as used in Example 11 under a crossed nicol. Then, the specimen started to transmit light at a temperature near 160° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 96° C. but no endothermic peak at all. The specimen was also tested for degree of crystallinity in the same manner as in Example 11, to give one of 7%.

The logarithmic viscosity and results by DSC of this polymer and the oxygen permeability and evaluation result of stretchability (3×3, simultaneous biaxial stretching) of the pressed film are shown in Table 2.

Example 18 [Preparation example of thermotropic liquid crystal polyester (B)]

Example 17 was repeated except for using 564 g (3.0 moles) of 6-hydroxy-2-naphthoic acid, 138 g (1.0 mole) of p-hydroxybenzoic acid, 490 g (4.8 moles) of acetic anhydride, 480 g (8.0 moles) of acetic acid and 1,452 g (6.0 moles) the polyethylene naphthalate, to obtain a polyester.

The obtained polymer was observed with the same apparatus as used in Example 11 under a crossed nicol. Then, the specimen started to transmit light at a temperature near 250° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 78° C. and an endothermic peak at 252° C.

The logarithmic viscosity and results by DSC of this polymer and the oxygen permeability and evaluation result stretchability (3×3, simultaneous biaxial stretching) of the pressed film are shown in Table 2.

Example 19 [Preparation example of thermotropic liquid crystal polyester (B)]

Example 17 was repeated except for using 376 g (2.0 moles) of 6-hydroxy-2-naphthoic acid, 138 g (1.0 mole) of p-hydroxybenzoic acid, 367 g (3.6 moles) of acetic anhydride, 360 g (6.0 moles) of acetic acid and 1,694 g (7.0 moles) of the polyethylene naphthalate, to obtain a polyester.

The obtained polymer was observed with the same apparatus as used in Example 11 under a crossed nicol. Then, the specimen started to transmit light at a temperature near 255° C., the amount of light transmitted increasing thereafter with temperature, and, eventually, remained forming optically anisotropic melt phase when the temperature reached 350° C. The polymer was analyzed by DSC in the same manner as in Example 11, to be found to show a glass transition temperature at 122° C. and an endothermic peak at 256° C.

The logarithmic viscosity and results by DSC of this polymer and the oxygen permeability and evaluation result stretchability (3×3 simultaneous biaxial stretching) of the pressed film are shown in Table 2.

amount of light transmitted increasing thereafter with temperature, and, eventually, remained forming optically anisotropic melt phase when the temperature reached 250° C. A specimen obtained by rapidly quenching the melt of this polymer was analyzed by DSC at a temperature elevating rate of 10° C./min. The specimen showed no glass transition temperature and only showed an endothermic peak at 258° C. The specimen was tested for degree of crystallinity by X-ray wide-angle scattering, to be found to have one of 27%.

The polymer was melted and pressed at 290° C. and then rapidly quenched with a water-cooled cooling press to form a film having a thickness of about 100 μm. An attempt was made to simultaneously biaxially stretching by 3×3 times the obtained film with a biaxially stretching apparatus made by Shibayama Kagaku Kiki Seisakusho Co. while changing the stretching temperature within a range of from 100° to 240° C. The film could not be stretched at all and broke at any temperature. The heat-pressed film was further tested for oxygen permeability with a gas transmission rate tester, OX-TRAM 10/50A made by Modern Control Co. at 20° C., 65% RH, to give one of 5.8 ml . 20 μm/m².day.atm.

The logarithmic viscosity and results by DSC of this polymer and the oxygen permeability and evaluation result stretchability (3×3, simultaneous biaxial stretching) of the pressed film are shown in Table 3.

Comparative Example 2

Example 3 was repeated except for using p-acetoxybenzoic acid (4.0 moles) instead of 6-acetoxy-2-naphthoic acid, to obtain a polyester. The obtained polymer was observed with the same apparatus as used in Example 1 under a crossed nicol. Then, the specimen started to transmit light at a temperature near 260° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed no glass transition temperature and only showed an endothermic peak at 263° C.

The logarithmic viscosity and results by DSC of this polymer and the oxygen permeability and evaluation result stretchability (3×3, simultaneous biaxial stretching) of the pressed film are shown in Table 3.

TABLE 2

| Example | $\eta_{inh}$ (dl/g) | $T_g$ (°C.) | $T_m$ (°C.) | $PO_2$ (ml · 20 μm/m² · day · atm) | Stretchability (3 × 3 times) |
|---|---|---|---|---|---|
| 11 | 0.62 | 86 | — | 1.2 | good |
| 12 | 0.68 | 81 | — | 2.0 | good |
| 13 | 0.58 | 75 | — | 3.2 | good |
| 14 | 0.64 | 89 | — | 1.3 | good |
| 15 | 0.66 | 80 | — | 1.8 | good |
| 16 | 0.62 | 72 | — | 3.0 | good |
| 17 | 1.15 | 96 | — | 0.5 | good |
| 18 | 0.67 | 78 | 253 | 2.3 | good |
| 19 | 0.70 | 122 | 256 | 6.3 | good |

Comparative Example

Example 1 was repeated except for using p-acetoxybenzoic acid (6 moles) instead of 6-acetoxy-2-naphthoic acid, to obtain a polyester. The obtained polymer was observed with the same apparatus as used in Example 1 under a crossed nicol. Then, the specimen started to transmit light at a temperature near 255° C., the

Comparative Example 3

Example 8 was repeated except for using p-acetoxybenzoic acid (6.0 moles) instead of 6-acetoxy-2-naphthoic acid, to obtain a polyester. The obtained polymer was observed with the same apparatus as used in Example 1 under a crossed nicol. Then, the specimen started to transmit light at a temperature near 200° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed no glass transition temperature and only showed an endothermic peak at 205° C. Injection molding was next conducted under the same conditions as in Example 1, to obtain a specimen, which was then tested for flexural strength and flexural modulus, to give the following results (data in the direction of resin flow).

Flexural strength: 970 kg/am$^2$
Flexural modulus: $8.1 \times 10^4$ kg/cm2

The logarithmic viscosity and results by DSC of this polymer and the oxygen permeability and evaluation result of stretchability (3×3, simultaneous biaxial stretching) of the pressed film are shown in Table 3.

Comparative Example 4

Example 1 was repeated except for changing the moles ratio of polyethylene naphthalate/6-acetoxy-2-naphthoic acid to 90/10, to obtain a polyester. The obtained polymer was observed with the same apparatus as used in Example 1 under a crossed nicol. However, the specimen formed no optically anisotropic melt phase at any temperature below 350° C. A specimen obtained by rapidly quenching the melt of this polymer was analyzed by DSC at a temperature elevating rate of 10° C./min. The specimen showed a glass transition temperature at 123° C. and an endothermic peak at 260° C.

The logarithmic viscosity and results by DSC of this polymer and the oxygen permeability and evaluation result of stretchability (3×3, simultaneous biaxial stretching) of the pressed film are shown in Table 3.

Comparative Example 5

A reaction vessel equipped with a stirrer, a distillation column and a nitrogen gas inlet was charged with 166 g (1.0 mole) of terephthalic acid, 100 g (0.52 mole) of resorcinol diacetate and 104 g (0.5 mole) of methylhydroquinone diacetate. The reaction system was substituted three times with nitrogen gas and the contents were heated over 5 hours to 200° to 320° C. with stirring with nitrogen gas flowing into the system, whereby about 90% of theoretical amount acetic acid was distilled off. The reaction system was further evacuated and reaction was effected under a pressure of 1 mmHg or below for 1 hour, and the product polyester was withdrawn.

The obtained polymer was observed with the same apparatus as used in Example 1 under a crossed nicol. Then, the specimen started to transmit light at a temperature near 200° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 127° C. and an endothermic peak at 200° C. The specimen was also tested for degree of crystallinity by X-ray wide-angle scattering, to give one of 10%.

The logarithmic viscosity and results by DSC of this polymer and the oxygen permeability and evaluation result of stretchability (3×3, simultaneous biaxial stretching) of the pressed film are shown in Table 3.

Comparative Example 6

The same polyethylene naphthalate as used in Example 1 alone was analyzed by DSC in the same manner as in Example 1, and a pressed film was prepared therefrom and evaluated for oxygen permeability and stretchability in the same manner as in Example 1. The results are shown in Table 3.

Comparative Example 7

The same polyethylene terethalate as used in Example 6 alone was analyzed by DSC in the same manner as in Example 1, and a pressed film was prepared therefrom and evaluated for oxygen permeability and stretchability in the same manner as in Example 1. The results are shown in Table 3.

Comparative Example 8

Example 11 was repeated except for changing the moles ratio of polyethylene naphthalate/6-acetoxy-2-naphthoic acid/p-acetoxybenzoic acid to 90/5/5, to obtain a polyester. The obtained polymer was observed with the same apparatus as used in Example 11 under a crossed nicol. However, the specimen formed no optically anisotropic melt phase at any temperature below 350° C. The polymer was analyzed by DSC in the same manner as in Example 11, to be found to show a glass transition temperature at 123° C. and an endothermic peak at 260° C.

The logarithmic viscosity and results by DSC of this polymer and the oxygen permeability and evaluation result of stretchability (3×3 simultaneous biaxial stretching) of the pressed film are shown in Table 3.

TABLE 3

| Comp. Ex. | $\eta_{inh}$ (dl/g) | $T_g$ (°C.) | $T_m$ (°C.) | $PO_2$ (ml · 20 μm/m$^2$ · day · atm) | Stretchability (3 × 3 times) |
|---|---|---|---|---|---|
| 1 | 0.58 | — | 258 | 5.8 | unstretchable |
| 2 | 0.64 | — | 263 | 7.5 | unstretchable |
| 3 | 0.60 | — | 205 | 16.3 | unstretchable |
| 4 | 0.68 | 123 | 260 | 59.0 | good |
| 5 | 0.55 | 127 | 200 | 71.0 | unstretchable |
| 6 | — | 123 | 272 | 70.0 | good |
| 7 | — | 80 | 252 | 175 | good |
| 8 | 0.68 | 123 | 260 | 59.0 | good |

Examples 20 through 22 and Comparative Examples 9 and 10 [Preparation examples of stretched film]

The pressed films obtained in Examples 1 to 3 and Comparative Examples 6 and 7 were each simultaneously biaxially stretched by 3×3 times at a temperature of 100° to 240° C. and then heat set at a temperature of 120° to 200° C. for 15 minutes, to give biaxially stretched films. The oxygen permeabilities of the obtained films are shown in Table 4.

TABLE 4

|  | Pressed film used | $PO_2$ of stretched film (ml · 20 μm/m² · day · atm) |
| --- | --- | --- |
| Example 20 | Film of Example 1 | 1.7 |
| Example 21 | Film of Example 2 | 1.0 |
| Example 22 | Film of Example 3 | 1.0 |
| Comparative Example 9 | Film of Comparative Example 6 | 20 |
| Comparative Example 10 | Film of Comparative Example 7 | 70 |

Examples 23 through 26 and Comparative Examples 17 through 13 [Preparation example of laminated and stretched films]

Multilayered sheets were prepared by using the thermotropic liquid crystal polymers obtained in Examples 1, 8, 11 and 12 and a PET resin having an intrinsic viscosity as determined at 30° C. in a 1/1 by weight mixed solvent of phenol/tetrachloroethane of 0.75 dl/g. Thus, each one of the thermotropic liquid crystal polyesters and the PET resin were vacuum-dried at 80° C. and 150° C. respectively for 1 full day and then co-extruded through two extruders to give a PET/thermotropic liquid crystal polyester/PET 3-layer sheet. Each layer of the PET/thermotropic liquid crystal polyester/PET of the obtained sheets had a thickness of 280 μm/20 μm/200 μm. The multilayered sheets thus obtained were simultaneously biaxially stretched by 3×3 times at a temperature of 100° to 120° C. through the biaxially stretching apparatus as used in Example 1, to give stretched films (Examples 23 through 26).

Attempts were made to form the same 2 kinds/3 layers PET/thermotropic liquid crystal polyester/PET film as above using the thermotropic liquid crystal polyester obtained in Comparative Example 1 or that in Comparative Example 3. In both cases, a good film could not be obtained because the intermediate layer (thermotropic liquid crystal polyester layer) could not be stretched (Comparative Examples 11 and 12).

A single-layer sheet having a thickness of about 500 μm was prepared using the PET resin alone and through one of the above extruders. The obtained sheet was simultaneously biaxially stretched by 3×3 times with the above biaxially stretching apparatus at 120° C., to give a stretched film (Comparative Example 13).

These films were evaluated for gas barrier property by the afore-described method. The results are shown in Table 5.

TABLE 5

|  | Thermotropic liquid crystal polymer used | $PO_2$ of laminated and stretched film (ml · 20 μm/m² · day · atm) |
| --- | --- | --- |
| Example 23 | Polymer of Example 1 | 31.8 |
| Example 24 | Polymer of Example 8 | 45.9 |
| Example 25 | Polymer of Example 11 | 25.2 |
| Example 26 | Polymer of Example 12 | 37.9 |
| Comparative Example 11 | Polymer of Comparative Example 1 | Could not be formed |
| Comparative Example 12 | Polymer of Comparative Example 3 | Could not be formed |
| Comparative Example 13 | — | 150 |

TABLE 5-continued

|  | Thermotropic liquid crystal polymer used | $PO_2$ of laminated and stretched film (ml · 20 μm/m² · day · atm) |
| --- | --- | --- |
| Example 13 |  |  |

Example 27 [Preparation example of thermotropic liquid crystal polyester (C)]

An 8-1 reaction vessel equipped with a stirrer, a distillation column and a nitrogen gas inlet was charged with 1,316 g (7.0 moles) of 6-hydroxy-2-naphthoic acid(HNA), 138 g (1.0 mole) of p-hydroxybenzoic acid(HBA), 918 g (9.0 moles) of acetic anhydride, 384 g (2.0 moles) of a polyethylene terephthalate(PET) having an intrinsic viscosity as determined on its solution in a 1/1 by weight mixed phenol/tetrachloroethane solvent of 0.70 dl/g and 960 g (16.0 moles) of acetic acid as a reaction solvent. The reaction system was substituted three times with nitrogen gas and the contents were heated with stirring at 130° C. under reflux for about 2 hours with nitrogen gas flowing into the system. Thereafter, the system was heated with stirring at 230° C. for about 2 hours, then heated with stirring to 270° C. over about 2 hours, then gradually evacuated and subjected to further reaction under a pressure of about 30 mmHg for about 2 hours. By this operation, about 95% of theoretical amount of acetic acid and acetic anhydride was distilled off. The reaction system was further evacuated and reaction was effected under a pressure of 1 mmHg or below for 1 hour, and the product polyester was withdrawn.

The condition of reaction system was suspension-like until the temperature of the system was raised up to 270° C., afterward, was shifted into molten state with the evolution of acetic acid. So, smooth stirring was achieved throughout all reaction processes.

The thus obtained polymer was dissolved in pentafluoro-phenol and the solution was subjected to H-NMR and C-NMR spectrometries, to reveal that the ratio of the contents of structural units constituting the polymer, structural unit (6)/structural unit (2)/structural unit (3)/structural unit (5) was 16.9/16.6/58.1/8.4, which is substantially the same as the ratio of the amounts of starting materials fed.

The minute specimen of the obtained polymer was heated in a heating device for microscope (TH-600; made by Linkam Co.) under a nitrogen atmosphere at a rate of 10° C./min and observed with a polarization microscope and under a crossed nicol. Then, the specimen started to transmit light at a temperature near 150° C., the amount of light transmitted increasing thereafter with temperature, and eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 95° C. but no endothermic peak at all. The specimen was tested for degree of crystallinity by X-ray wide-angle scattering, to be found to have one of 10%.

Next, the polymer was melted and pressed at 280° C. and then rapidly quenched through a water cooled cooling press to form a film having a thickness of about 100 m. The film obtained was tested for oxygen gas permeability with a gas transmission tester, OX- TRA/10/5OA made by modern Control Co. at 20° C., 65% RH, to give one of 0.4 ml 20 m/m day atm.

A heat-pressed film having a thickness of about 100 m and obtained in the same manner was subjected to 3×3 simultaneous biaxial stretching at a temperature of 160° C. through a biaxially stretching machine made by Shibayama Kagaku Kiki Seisakusho Co., to give a uniform film having a thickness of about 10 m.

Example 28 [Preparation example of thermotropic liquid crystal polyester (C)]

Example 27 was repeated except for setting the molar ratio of 6-hydroxy-2-naphthoic acid/p-hydroxybenzoic acid/polyethylene terephthalate to 60/10/30, to obtain a polyester.

The analysis of the polyester using NMR spectrometries revealed that the ratio of the contents of structural units constituting the polymer, structural unit (6)/structural unit (2)/structural unit (3)/structural unit (5) was 23.5/23.3/45.8/7.4, which is substantially the same as the ratio of the amounts of starting materials fed.

The obtained polymer was observed with the same apparatus as used in Example 27 under a crossed nicol. Then, the specimen started to transmit light at a temperature near 150° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 86° C. but no endothermic peak at all. The specimen was tested for degree of crystallinity by X-ray wide-angle scattering, to be found to have one of 8%.

The inherent viscosity and the oxygen permeability and evaluation result of stretchability (3×3, simultaneous biaxial stretching) of the pressed film are shown in Table 6.

Example 29 [Preparation example of thermotropic liquid crystal polyester (C)]

Example 27 was repeated except for setting the mole ratio of 6-hydroxy-2-naphthoic acid/p-hydroxybenzoic acid/polyethylene terephthalate to 50/10/40, to obtain a polyester.

The analysis of the polyester using NMR spectrometries revealed that the ratio of the contents of structural units constituting the polymer, structural unit (6) structural unit (2)/structural unit (3)/structural unit (5) was 28.5/28.8/35.8/6.9, which is substantially the same as the ratio of the amounts of starting materials fed.

The obtained polymer was observed with the same apparatus as used in Example 27 under a crossed nicol. Then, the specimen started to transmit light at a temperature near 140° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 82° C. but no endothermic peak at all. The specimen was tested for degree of crystallinity by X-ray wide-angle scattering, to be found to have one of 11%.

The inherent viscosity and the oxygen permeability and evaluation result of stretchability (3×3 simultaneous biaxial stretching) of the pressed film are shown in Table 6.

Example 30 [Preparation example of thermotropic liquid crystal polyester (C)]

Example 27 was repeated except for setting the mole ratio of 6-hydroxy-2-naphthoic acid/p-hydroxybenzoic acid/polyethylene terephthalate to 30/30/40, to obtain a polyester.

The analysis of the polyester using NMR spectrometries revealed that the ratio of the contents of structural units constituting the polymer, structural unit (6)/structural unit (2)/structural unit (3)/structural unit (5) was 28.4/28.6/21.2/21.8, which is substantially the same as the ratio of the amounts of starting materials fed.

The obtained polymer was observed with the same apparatus as used in Example 27 under a crossed nicol. Then, the specimen started to transmit light at a temperature near 140° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 76° C. but no endothermic peak at all. The specimen as tested for degree of crystallinity by X-ray wide-angle scattering, to be found to have one of 13%.

The inherent viscosity and the oxygen permeability and evaluation result of stretchability (3×3, simultaneous biaxial stretching) of the pressed film are shown in Table 6.

Comparative Example 14

An 8-1 reaction vessel equipped with a stirrer, a distillation column and a nitrogen gas inlet was charged with 1.610 g (7.0 moles) of 6-acetoxy-2-naphthoic acid (Ac-NHA), 180 g (1.0 mole) of p-acetoxybenzoic acid (Ac-HBA), and 384 g (2.0 moles) of a polyethylene terephthalate (PET) which was used in Example 27.

The reaction system was substituted three times with nitrogen gas and the contents were heated with stirring at 280° C. under nitrogen purge during about 1 hour after which time approximately 90% of theoretical acetic acid had evolved and was distilled off. Then, the reaction system was evacuated and reaction was effected under a pressure of 1 mmHg or below for 5 hours, and the product polyester was withdrawn.

The analysis of the polyester using NMR spectrometries revealed that the ratio of the contents of structural units constituting the polymer, structural unit (6)/structural unit (2)/structural unit (3)/structural unit (5) was 17.1/17.2/57.7/8.0, which is substantially the same as the ratio of the amounts of starting materials fed.

The obtained polymer was observed with the same apparatus as used in Example 27 under a crossed nicol, then, the specimen started to transmit light at a temperature near 150° C., the amount of light transmitted increasing thereafter with temperature, and, eventually, remained forming optically anisotropic melt phase when the temperature reached 350° C. A specimen obtained by rapedly quenching the melt of this polymer was analyzed by DSC at a temperature elevating rate of 10° C./min. The specimen showed a glass transition temperature at 94° C. and endothermic peak at 205° C. The specimen was tested for degree of crystallinity by X-ray wide-angle scattering, to be found to have one of 17%.

Next, the polymer was melted and pressed at 280° C. and then rapidly quenched through a water-cooled cooling press to form a film having a thickness of about 100 μm. The film obtained was subjected to 3×3 simultaneous biaxial stretching at a temperature of 160° C. through a biaxially stretching machine made by Shibayama Kagaku Kiki Seisakusho Co., to give a film having a thickness of about 10 μm. Thus obtained stretched film contained crystals which measure approximately 10~20 μm in diameter, and was inferior in surface uniformity.

The inherent viscosity and the oxygen permeability and evaluation result of stretchability (3×3, simultaneous biaxial stretching) of the pressed film are shown in Table 6.

Comparative Example 15

Comparative Example 14 was repeated except for setting the mole ratio of 6-acetoxy-2-naphthoic acid/p-acetoxybenzoic acid/polyethylene terephthalate to 50/10/40 to obtain a polyester.

The analysis of the polyester using E spectrometries revealed that the ratio of the contents of structural units constituting the polymer, structural unit (6)/structural unit (2)/structural unit (3)/structural unit (5) was 28.8/28.6/35.4/7.2, which is substantially the same as the ratio of the amounts of starting materials fed.

The obtained polymer was observed with the same apparatus as used in Example 27 under a crossed nicol. Then, the specimen started to transmit light at a temperature near 140° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 80° C. and endothermic peak at 210° C. The specimen was tested for degree of crystallinity by X-ray wide-angle scattering, to be found to have one of 20%.

The inherent viscosity and the oxygen permeability and evaluation result of stretchability (3×3, simultaneous biaxial stretching) of the pressed film are shown in Table 6.

Comparative Example 16

Comparative Example 14 was repeated except for setting the mole ratio of 6-acetoxy-2-naphthoic acid/p-acetoxybenzoic acid/polyethylene terephthalate to 30/30/40 to obtain a polyester.

The analysis of the polyester using NMR spectrometries revealed that the ratio of the contents of structural units constituting the polymer, structural unit (6)/structural unit (2)/structural unit (3)/structural unit (5) was 28.8/28.6/21.4/21.2, which is substantially the same as the ratio of the amounts of starting materials fed.

The obtained polymer was observed with the same apparatus as used in Example 27 under a crossed nicol. Then, the specimen started to transmit light at a temperature near 140° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed a glass transition temperature at 70° C. and endothermic peak at 213° C. The specimen was tested for degree of crystallinity by X-ray wide-angle scattering, to be found to have one of 19%.

The inherent viscosity and the oxygen permeability and evaluation result of stretchability (3×3, simultaneous biaxial stretching) of the pressed film are shown in Table 6.

Comparative Example 17

Comparative Example 15 was repeated except for using p-acetoxybenzoic acid instead of 6-acetoxy-2-naphthoic acid, to obtain a polyester.

The analysis of the polyester using NMR spectrometries revealed that the ratio of the contents of structural units constituting the polymer, structural unit (6)/structural unit (2)/structural unit (5) was 28.8/28.6/42.6, which is substantially the same as the ratio of the amounts of starting materials fed.

The obtained polymer was observed with the same apparatus as used in Example 27 under a crossed nicol. Then, the specimen started to transmit light at a temperature near 200° C., the amount of light transmitted increasing thereafter with temperature, and, eventually, remained forming optically anisotropic melt phase when the temperature reached 350° C. A specimen obtained by rapidly quenching the melt of this polymer was analyzed by DSC at a temperature elevating rate of 10° C./min. The specimen showed an endothermic peak at 205° C. but no apparent glass transition temperature. The specimen was tested for degree of crystallinity by X-ray wide-angle scattering, to be found to have one of 25%.

The inherent viscosity and the oxygen permeability and evaluation result of stretchability (3×3 simultaneous biaxial stretching) of the pressed film are shown in Table 6.

Comparative Example 18

The oxygen permeability and evaluation result of stretchability (3×3, simultaneous biaxial stretching) of the pressed film prepared from polyethylene terephthalate used in Example 27 as starting material, are shown in Table 6. Examples 31 and 32 [Preparation example of laminated and stretched film]

Comparative Examples 19 and 20

A multi-layered sheet was prepared by using the thermotropic liquid crystal polymer obtained in Examples 27 or 28 and a polypropylene resin(PP). Thus, the thermotropic liquid crystal polyester and the polypropylene resin were vacuum-dried at 90° C. for 1 day and then co-extruded through two extruders to give a 3-layer PP/thermotropic liquid crystal polyester/PP sheet. Each layer of the PP/thermotropic liquid crystal polyester/PP of the obtained sheet had thickness of 280 μm/20 μm/280 μm. Thus obtained multi-layered sheet was simultaneously biaxially stretched at 170° C. by 3×3 times through the same biaxially stretching apparatus as used in Example 27 to give a stretched film. (Examples 31 and 32).

Next, the polypropylene resin was vacuum-dried at 90° C. for 1 day and then co-extruded through one extruder to give a single-layer sheet. Thus obtained single-layer sheet was simultaneously biaxially stretched at 170° C. by 3×3 times through the same biaxially stretching apparatus as used in Example 27 to give a stretched film. (Comparative Example 19).

The oxygen permeability of these laminated and stretched films which was tested with the same apparatus as used in Example 1, are shown in Table 7.

Next, stretching of 3-layer PP/thermotropic liquid crystal polyester/PP sheet using thermotropic liquid crystal polyester prepared in Example 27 was tried. However, stretching of middle layer (Thermotropic liquid crystal layer) as not achieved at 140°~200° C., so good stretched film could not be obtained (Comparative Example 20).

TABLE 6

| | $\eta_{inh}$ (dl/g) | PO$_2$ (ml · 20 μm/m2 · day · atm) | Stretchability |
|---|---|---|---|
| Example | | | |
| 27 | 1.02 | 0.4 | good |
| 28 | 0.97 | 1.2 | good |
| 29 | 0.92 | 2.2 | good |
| 30 | 0.86 | 2.6 | good |
| Comparative Example | | | |
| 14 | 0.60 | 1.1 | not good |
| 15 | 0.64 | 4.1 | not good |
| 16 | 0.55 | 4.7 | not good |
| 17 | 0.66 | 16.3 | impossible |
| 18 | | 175.0 | good |

TABLE 7

| | Thermotropic liquid crystal polyester as used | PO$_2$ (ml · 20 μm/m$^2$ · day · atm) |
|---|---|---|
| Example | | |
| 31 | TLCP prepared in Example 27 | 10.0 |
| 32 | TLCP prepared in Example 28 | 29.7 |
| Comparative Example | | |
| 19 | — | 2500 |
| 20 | TLCP prepared in Comparative Example 17 | impossible to mold |

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A thermotropic liquid crystal polyester consisting essentially of a structural unit (4) represented by the following formula:

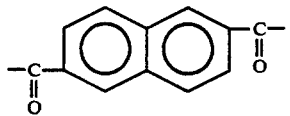

a structural unit (2) represented by the following formula

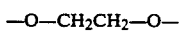

and a structural unit (3) represented by the following formula:

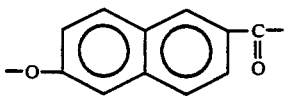

said structural units (4) and (2) being present in about equimolar amounts, the sum of said structural units (4) and (2) being 15 to 90 mol % and said structural unit (3) being present in an amount of 10 to 85 mol % prepared by a method (I) comprising:

reacting a polyethylene naphthalate consisting essentially of units having structural unit (4) and structural unit (2), and an acyloxyaromatic carboxylic acid consisting essentially of 6-acyloxy-2-naphthoic acid; or prepared by a method (II) comprising:

reacting a polyethylene naphthalate consisting essentially of units having structural unit (4) and structural unit (2), a hydroxyaromatic carboxylic acid consisting essentially of 6-hydroxy-2-naphthoic acid and a lower aliphatic acid anhydride of from 1.02 to 1.50 mole equivalent based on the hydroxyaromatic carboxylic acid in the presence of solvent at a temperature ranging form 100° C. to 150° C. until the conversion of the hydroxyaromatic carboxylic acid reaches not less than 95 mol %, and reacting the obtained reaction mixture at a temperature higher than 150° C.

2. A thermotropic liquid crystal polyester according to claim 1, wherein the sum of said structural units (4) and (2) is 25 to 85 mol % and the content of said structural unit (3) is 15 to 75 mol %.

3. A shaped article comprising the thermotropic liquid crystal polyester of claim 1.

4. A thermotropic liquid crystal polyester consisting essentially of a structural unit (4) represented by the following formula:

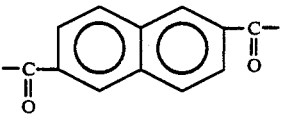

a structural unit (2) represented by the following formula

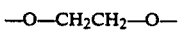

a structural unit (3) represented by the following formula:

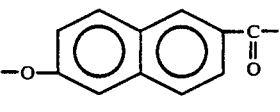

and a structural unit (5) represented by the following formula:

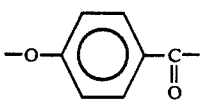

said structural units (4) and (2) being present in about equimolar amounts, the sum of said structural units (4) and (2) being 15 to 90 mol %, the sum of said structural units (3) and (5) being 10 to 85 mol % and the ratio of said structural unit (3) to the sum of said structural units (3) and (5) being at least 10 mol % prepared by a method (I) comprising:

reacting a polyethylene naphthalate consisting essentially of units having structural unit (4) and structural unit (2), and an acyloxyaromatic carboxylic acid consisting essentially of 6-acyloxy-2-naphthoic acid and a p-acyloxybenzoic acid, or prepared by a method (II) comprising:

reacting a polyethylene naphthalate consisting essentially of units having structural unit (4) and structural unit (2), a hydroxyaromatic carboxylic acid consisting essentially of 6-hydroxy-2-naphthoic acid and p-hydroxybenzoic acid and a lower aliphatic acid anhydride of from 1.02 to 1.50 mole equivalent based on the hydroxyaromatic carboxylic acid in the presence of solvent at a temperature ranging from 100° C. to 150° C. until the conversion of the hydroxyaromatic carboxylic acid reaches not less than 95 mol %, and reacting the obtained reaction mixture at a temperature higher than 150° C.

5. A thermotropic liquid crystal polyester according to claim 4, wherein the sum of said structural units (4) and (2) is 25 to 85 mol % and the sum of said structural units (3) and (5) is 15 to 75 mol %.

6. A shaped article comprising the thermotropic liquid crystal polyester of claim 4.

7. A thermotropic liquid crystal polyester consisting essentially of a structural unit (6) represented by the following formula

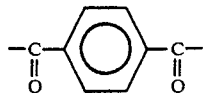

a structural unit (2) represented by the following formula

—O—CH$_2$CH$_2$—O— a structural unit (3) represented by the following formula

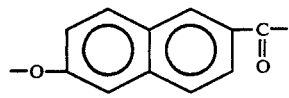

and a structural unit (5) represented by the following formula

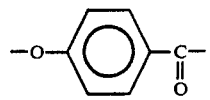

said structural unit (6) and said structural unit (2) being present in about equimolar amounts, the sum of said structural units (6) and (2) being 15 to 90 mol %, the sum of said structural units (3) and (5) being 10 to 85 mol %, and the ratio of said structural unit (3) to the sum of said structural units (3) and (5) being at least 10 mol %, prepared by a method comprising reacting a polyethylene terephthalate consisting essentially of a structural unit (6) and a structural unit (2), a hydroxy aromatic carboxylic acid consisting essentially of 6-hydroxy-2-naphthoic acid and p-hydroxybenzoic acid and a lower aliphatic acid anhydride of from 1.02 to 1.50 mole equivalent based on the hydroxy aromatic carboxylic acid in the presence of solvent at a temperature ranging from 100° C. to 150° till the conversion of the hydroxy aromatic carboxylic acid reaches not less than 95 mol % and reacting the obtained reaction mixture at a temperature higher than 150° C.

8. A thermotropic liquid crystal polyester according to claim 7, wherein the sum of said structural units (6) and (2) is 25 to 85 mol % and the sum of said structural units (3) and (5) is 15 to 75 mol %.

9. A shaped article comprising the thermotropic liquid crystal polyester of claim 7.

10. A packaging material comprising at least one polyester selected from the group consisting of a thermotropic liquid crystal polyester (A) consisting essentially of a structural unit (4) represented by the following formula

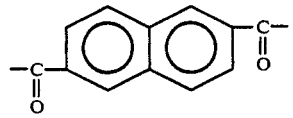

a structural unit (2) represented by the following formula

—O—CH$_2$CH$_2$—O— and a structural unit (3) represented by the following formula

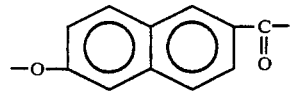

said structural units (4) and (2) being present in about equimolar amounts, the sum of said structural units (4) and (2) being 15 to 90 mol % and said structural unit (3) being present in an amount of 10 to 85 mol %;

a thermotropic liquid crystal polyester (B) consisting essentially of the above structural unit (4)

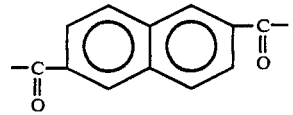

the above structural unit (2), the above structural unit (3) and a structural unit (5) represented by the following formula

said structural units (4) and (2) being present in about equimolar amounts, the sum of said structural units (4) and (2) being 15 to 90 mol %, the sum of said structural units (3) and (5) being 10 to 85 mol % and the ratio of said structural unit (3) to the sum of said structural units (3) and (5) being at least 10 mol %; and a thermotropic liquid crystal, polyester (C) consisting essentially of a structural unit (6) represented by the following formula

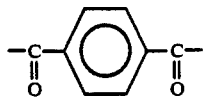

the above structural unit (2), the above structural unit (3) and the above structural unit (5), said structural unit (6) and said structural unit (2) being present in about equimolar amounts, the sum of said structural units (6) and (2) being 15 to 90 mol %, the sum of said structural units (3) and (5) being 10 to 85 mol %, and the ratio of said structural unit (3) to the sum of said structural units (3) and (5) being at least 10 mol %, prepared by a method comprising reacting a polyethylene terephthalate consisting essentially of a structural unit (6) and a structural unit (2), a hydroxy aromatic carboxylic acid consisting essentially of 6-hydroxy-2-naphthoic acid and p-hydroxybenzoic acid and a lower aliphatic acid anhydride of form 1.02 to 1.50 mole equivalent based on the hydroxy aromatic carboxylic acid in the presence of solvent at a temperature ranging form 100° C. to 150° C. till the conversion of the hydroxy aromatic carboxylic acid reaches not less than 95 mol % and reacting the obtained reaction mixture at a temperature higher than 150° C.

11. The packaging material according to claim 10, comprising a thermotropic liquid crystal, polyester consisting essentially of a structural unit (6) represented by the following formula

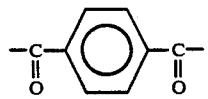

a structural unit (2) represented by the following formula

—O—CH$_2$CH$_2$—O— a structural unit (3) represented by the following formula

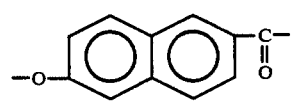

and a structural unit (5) represented by the following formula

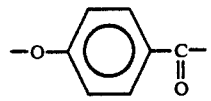

said structural unit (6) and said structural unit (2) being present in about equimolar amounts, the sum of said structural units (6) and (2) being 15 to 90 mol %, the sum of said structural units (3) and (5) being 10 to 85 mol %, and the ratio of said structural unit (3) to the sum of said structural units (3) and (5) being at least 10 mol %, prepared by a method comprising reacting a polyethylene terephthalate consisting essentially of a structural unit (6) and a structural unit (2), a hydroxy aromatic carboxylic acid consisting essentially of 6-hydroxy-2-naphthoic acid and p-hydroxybenzoic acid and a lower aliphatic acid anhydride of from 1.02 to 1.50 mole equivalent based on the hydroxy aromatic carboxylic acid in the presence of solvent at a temperature ranging form 100° C. to 150° C. till the conversion of the hydroxy aromatic carboxylic acid reaches not less than 95 mol % and reacting the obtained reaction mixture at a temperature higher than 150° C.

12. A container comprising at least one polyester selected from the group consisting of a thermotropic liquid crystal polyester (A) consisting essentially of a structural unit (4) represented by the following formula

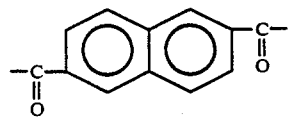

a structural unit (2) represented by the following formula

—O—CH$_2$CH$_2$—O— and a structural unit (3) represented by the following formula

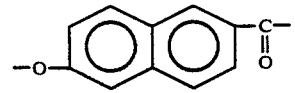

said structural units (1) and (2) being present in about equimolar amounts, the sum of said structural units (1) and (2) being 15 to 90 mol % and said structural unit (3) being contained in an amount of 10 to 85 mol %; a thermotropic liquid crystal polyester (B) consisting essentially of the above structural unit (4),

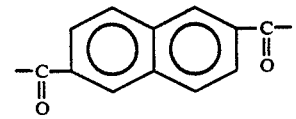

the above structural unit (2) the above structural unit (3) and a structural unit (5) represented by the following formula

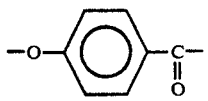

said structural units (4) and (2) being present in about equimolar amounts, the sum of said structural units (4) and (2) being 15 to 90 mol %, the sum of said structural units (3) and (5) being 10 to 85 mol % and the ratio of said structural unit (3) to the sum of said structural units (3) and (5) being at least 10 mol %; and a thermotropic liquid crystal, polyester (C) consisting essentially of a structural unit (6) represented by the following formula

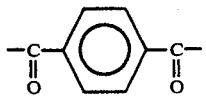

the above structural unit (2), the above structural unit (3) and the above structural unit (5), said structural unit (6) and said structural unit (2) being present in about equimolar amounts, the sum of said structural units (6) and (2) being 15 to 90 mol %, the sum of said structural units (3) and (5) being 10 to 85 mol %, and the ratio of said structural unit (3) to the sum of said structural units (3) and (5) being at least 10 mol %, prepared by a method comprising reacting a polyethylene terephthalate consisting essentially of a structural unit (6) and a structural unit (2), a hydroxy aromatic carboxylic acid consisting essentially of 6-hydroxy-2-naphthoic acid and p-hydroxybenzoic acid and a lower aliphatic acid anhydride of from 1.02 to 1.50 mole equivalent based on the hydroxy aromatic carboxylic acid in the presence of solvent at a temperature ranging from 100° C. to 150° C. till the conversion of the hydroxy aromatic carboxylic acid reaches not less than 95 mol % and reacting the obtained reaction mixture at a temperature higher than 150° C.

13. A container according to claim 12, wherein the wall of said container has an oxygen permeability determined at 20° C. of not more than 20 ml . 20 μm/m².day.atm.

14. A container according to claim 12, comprising a thermotropic liquid crystal, polyester consisting essentially of a structural unit (6) represented by the following formula

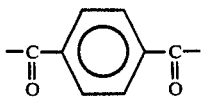

a structural unit (2) represented by the following formula

—O—CH₂CH₂—O— a structural unit (3) represented by the following formula

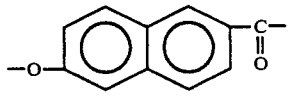

and a structural unit (5) represented by the following formula

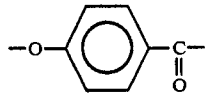

said structural unit (6) and said structural unit (2) being present in about equimolar amounts, the sum of said structural units (6) and (2) being 15 to 90 mol %, the sum of said structural units (3) and (5) being 10 to 85 mol %, and the ratio of said structural unit (3) to the sum of said structural units (3) and (5) being at least 10 mol %, prepared by a method comprising reacting a polyethylene terephthalate consisting essentially of a structural unit (6) and a structural unit (2), a hydroxy aromatic carboxylic acid consisting essentially of 6-hydroxy-2-naphthoic acid and p-hydroxybenzoic acid and a lower aliphatic acid anhydride of from 1.02 to 1.50 mole equivalent based on the hydroxy aromatic carboxylic acid in the presence of solvent at a temperature ranging from 100° C. to 150° C. till the conversion of the hydroxy aromatic carboxylic acid reaches not less than 95 mol % and reacting the obtained reaction mixture at a temperature higher than 150° C.

* * * * *